US012450975B2

(12) United States Patent
Palmisano et al.

(10) Patent No.: US 12,450,975 B2
(45) Date of Patent: *Oct. 21, 2025

(54) SYSTEM AND METHOD FOR CHANGING BEACON IDENTIFIERS FOR SECURE MOBILE COMMUNICATIONS

(71) Applicant: Aristocrat Technologies, Inc., Las Vegas, NV (US)

(72) Inventors: Angelo Palmisano, Las Vegas, NV (US); Eric Taylor, Las Vegas, NV (US); Steven Santisi, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,594

(22) Filed: Mar. 27, 2024

(65) Prior Publication Data

US 2024/0242562 A1 Jul. 18, 2024

Related U.S. Application Data

(63) Continuation of application No. 17/819,523, filed on Aug. 12, 2022, now Pat. No. 11,972,659, which is a
(Continued)

(51) Int. Cl.
*G07F 17/32* (2006.01)
(52) U.S. Cl.
CPC ........ *G07F 17/3223* (2013.01); *G07F 17/322* (2013.01); *G07F 17/3234* (2013.01); *G07F 17/3241* (2013.01)
(58) Field of Classification Search
CPC ............. G07F 17/3223; G07F 17/3234; G07F 17/322; G07F 17/3241
See application file for complete search history.

(56) References Cited

U.S. PATENT DOCUMENTS

| D305,704 S | 1/1990 | Jones |
| 4,986,330 A | 1/1991 | McGonagle |

(Continued)

FOREIGN PATENT DOCUMENTS

| AU | 2008309026 A1 | 4/2009 |
| BR | 102020006852 A2 | 10/2021 |

(Continued)

OTHER PUBLICATIONS

Australian Examination Report No. 1 issued in App. No. AU2019240630, dated Jul. 25, 2024, 5 pages.
(Continued)

*Primary Examiner* — Steve Rowland
(74) *Attorney, Agent, or Firm* — Armstrong Teasdale LLP

(57) ABSTRACT

A system includes a casino management server and an electronic casino device that includes a beacon configured to wirelessly communicate with personal devices of players. The device transmits a request for a custom beacon ID to the casino management server, receives the custom beacon ID from the casino management server in response to the request; and configures the beacon with the custom beacon ID, thereby broadcasting the custom beacon ID to the personal device of the player. The server receives, from the personal device of the player, a pairing request that includes a received beacon ID as received by the personal device based on the broadcasting, validates that the received beacon ID matches the custom beacon ID, stores a valid association between the personal device of the player and the electronic casino device; and authorizes connected actions to be performed by the personal device based on the association.

20 Claims, 8 Drawing Sheets

Related U.S. Application Data continuation of application No. 17/262,178, filed as application No. PCT/US2019/053823 on Sep. 30, 2019, now Pat. No. 11,488,441.

(60) Provisional application No. 62/742,034, filed on Oct. 5, 2018.

(56) References Cited

U.S. PATENT DOCUMENTS

| | | | |
|---|---|---|---|
| 5,944,432 A | 8/1999 | Richardson | |
| D427,783 S | 7/2000 | Luedke | |
| 6,230,658 B1 | 5/2001 | Rudolph | |
| 6,278,122 B1 | 8/2001 | Gagnon | |
| 6,394,907 B1 | 5/2002 | Rowe | |
| 6,510,572 B2 | 1/2003 | Horowitz | |
| 6,585,598 B2 | 7/2003 | Nguyen | |
| 6,739,975 B2 | 5/2004 | Nguyen | |
| 6,835,134 B2 | 12/2004 | Poole | |
| 6,846,238 B2 | 1/2005 | Wells | |
| 6,866,586 B2 | 3/2005 | Oberberger | |
| 6,925,307 B1 | 8/2005 | Mamdani | |
| 7,114,718 B2 | 10/2006 | Grauzer | |
| 7,169,053 B2 | 1/2007 | Moik | |
| 7,240,036 B1 | 7/2007 | Mamdani | |
| 7,285,046 B2 | 10/2007 | Papulov | |
| 7,370,012 B2 | 5/2008 | Karns | |
| 7,390,263 B1 | 6/2008 | Acres | |
| 7,419,428 B2 | 9/2008 | Rowe | |
| 7,559,462 B2 | 7/2009 | Brosnan | |
| 7,749,079 B2 | 7/2010 | Chamberlain | |
| 7,771,277 B2 | 8/2010 | Chamberlain | |
| 7,819,742 B2 | 10/2010 | Chamberlain | |
| 7,918,728 B2 | 4/2011 | Nguyen | |
| D641,560 S | 7/2011 | Thompson | |
| 7,997,978 B2 | 8/2011 | Kaminkow | |
| 8,057,303 B2 | 11/2011 | Rasmussen | |
| 8,110,819 B2 | 2/2012 | Boyarsky | |
| D660,022 S | 5/2012 | Thompson | |
| 8,226,255 B2 | 7/2012 | Fan | |
| 8,333,653 B2 | 12/2012 | Nyman | |
| 8,382,582 B2 | 2/2013 | Sammon | |
| 8,393,955 B2 | 3/2013 | Arezina | |
| 8,449,378 B2 | 5/2013 | Michaelson | |
| 8,463,711 B2 | 6/2013 | Cunningham, II | |
| 8,469,800 B2 | 6/2013 | Lemay | |
| 8,523,657 B2 | 9/2013 | Michaelson | |
| 8,602,874 B2 | 12/2013 | Rowe | |
| 8,613,659 B2 | 12/2013 | Nelson | |
| D702,068 S | 4/2014 | Mitten | |
| 8,714,655 B2 | 5/2014 | Cahall | |
| 8,870,647 B2 | 10/2014 | Huizinga | |
| 8,875,639 B2 | 11/2014 | Summerville | |
| 8,956,222 B2 | 2/2015 | Lemay | |
| 8,961,298 B2 | 2/2015 | Czyzewski | |
| 8,992,306 B2 | 3/2015 | Iddings | |
| D726,424 S | 4/2015 | Nguyen | |
| 9,022,855 B2 | 5/2015 | Radisich | |
| 9,058,716 B2 | 6/2015 | Rajaraman | |
| 9,153,095 B2 | 10/2015 | Adiraju | |
| 9,159,189 B2 | 10/2015 | Froy, Jr. | |
| 9,167,383 B1 | 10/2015 | Barrand | |
| 9,226,578 B2 | 1/2016 | Battey | |
| 9,235,953 B2 | 1/2016 | Earley | |
| 9,245,414 B2 | 1/2016 | Radisich | |
| 9,269,231 B2 | 2/2016 | Curtin | |
| 9,311,769 B2 | 4/2016 | Lemay | |
| 9,317,995 B2 | 4/2016 | Nyman | |
| 9,324,209 B2 | 4/2016 | Cunningham, II | |
| 9,367,835 B2 | 6/2016 | Nelson | |
| 9,418,519 B2 | 8/2016 | Walker | |
| 9,437,073 B2 | 9/2016 | Lestrange | |
| 9,454,872 B2 | 9/2016 | Muir | |
| 9,483,901 B2 | 11/2016 | Nguyen | |
| 9,501,899 B2 | 11/2016 | Radisich | |
| D774,339 S | 12/2016 | Parshad | |
| 9,530,277 B2 | 12/2016 | Nelson | |
| D777,459 S | 1/2017 | Parshad | |
| 9,576,425 B2 | 2/2017 | Nguyen | |
| 9,580,031 B2 | 2/2017 | Kalis | |
| 9,613,491 B2 | 4/2017 | Roth | |
| 9,615,347 B1* | 4/2017 | Kerr | G07F 17/3218 |
| 9,629,064 B2 | 4/2017 | Graves | |
| 9,659,444 B2 | 5/2017 | Norris | |
| 9,666,027 B2 | 5/2017 | Curtin | |
| D796,216 S | 9/2017 | Rockwell | |
| 9,756,607 B1 | 9/2017 | Deluca | |
| 9,786,123 B2 | 10/2017 | Huizinga | |
| 9,852,578 B2 | 12/2017 | Nelson | |
| D807,652 S | 1/2018 | Kawamoto | |
| 9,875,499 B2 | 1/2018 | Washington | |
| 9,875,607 B2 | 1/2018 | Nelson | |
| 9,881,444 B2 | 1/2018 | Nelson | |
| 9,928,502 B2 | 3/2018 | Curtin | |
| 9,928,689 B2 | 3/2018 | Walker | |
| 9,941,753 B2 | 4/2018 | Asanuma | |
| 9,961,507 B1* | 5/2018 | Mendelson | H04W 4/029 |
| 9,974,873 B2 | 5/2018 | Cole | |
| 9,974,875 B2 | 5/2018 | Davis | |
| 9,999,699 B2 | 6/2018 | Sinai | |
| 10,009,868 B1* | 6/2018 | Reyes | G06Q 30/0261 |
| 10,013,850 B2 | 7/2018 | Nelson | |
| 10,032,334 B2 | 7/2018 | Cuddy | |
| 10,097,018 B2 | 10/2018 | Park | |
| 10,121,129 B2 | 11/2018 | Kalgi | |
| 10,121,318 B2 | 11/2018 | Lemay | |
| 10,121,319 B2 | 11/2018 | Radisich | |
| 10,131,432 B2 | 11/2018 | Simeon | |
| 10,134,223 B2 | 11/2018 | Mandava | |
| 10,134,234 B2 | 11/2018 | Lestrange | |
| 10,140,810 B1 | 11/2018 | Boyle | |
| 10,157,518 B2 | 12/2018 | Johnson | |
| 10,158,243 B2 | 12/2018 | Kim | |
| 10,192,400 B2 | 1/2019 | Price | |
| 10,192,401 B2 | 1/2019 | Nelson | |
| 10,198,906 B2 | 2/2019 | Walker | |
| 10,217,317 B2 | 2/2019 | Nelson | |
| 10,242,525 B1 | 3/2019 | Knust | |
| 10,242,530 B2 | 3/2019 | Arnone | |
| D848,159 S | 5/2019 | Hiyoshi | |
| D848,160 S | 5/2019 | Hiyoshi | |
| 10,282,939 B2 | 5/2019 | Yamaguchi | |
| 10,297,105 B2 | 5/2019 | Lemay | |
| 10,339,755 B2 | 7/2019 | Snow | |
| 10,360,761 B2 | 7/2019 | Higgins | |
| 10,360,763 B2 | 7/2019 | Higgins | |
| 10,373,430 B2 | 8/2019 | Higgins | |
| 10,380,843 B2 | 8/2019 | Higgins | |
| 10,417,867 B2 | 9/2019 | Nelson | |
| 10,453,297 B2 | 10/2019 | Lemay | |
| 10,456,488 B2 | 10/2019 | Bilenko | |
| 10,460,560 B2 | 10/2019 | Cunningham, II | |
| 10,460,563 B2 | 10/2019 | Miri | |
| D870,473 S | 12/2019 | Hamilton | |
| 10,529,179 B2 | 1/2020 | Weiss | |
| 10,546,463 B2 | 1/2020 | Higgins | |
| D874,164 S | 2/2020 | Hamilton | |
| 10,573,129 B2 | 2/2020 | Higgins | |
| 10,621,826 B2 | 4/2020 | Higgins | |
| 10,643,426 B2 | 5/2020 | Higgins | |
| 10,699,527 B2 | 6/2020 | Higgins | |
| 10,706,683 B2 | 7/2020 | Higgins | |
| 10,720,016 B2 | 7/2020 | Nelson | |
| 10,726,668 B2 | 7/2020 | Nelson | |
| 10,755,520 B2 | 8/2020 | Moore | |
| 10,769,885 B2 | 9/2020 | Hoehne | |
| 10,783,416 B2 | 9/2020 | Shigeta | |
| 11,011,020 B2 | 5/2021 | Springer | |
| 11,024,088 B2 | 6/2021 | Heinen | |
| 11,087,587 B2 | 8/2021 | Palmisano | |
| 11,094,161 B2 | 8/2021 | Cleveland | |
| 11,132,862 B2 | 9/2021 | Cleveland | |
| 11,227,466 B2 | 1/2022 | Rousseau | |
| D944,015 S | 2/2022 | Greenwood | |

(56) References Cited

U.S. PATENT DOCUMENTS

| | | | |
|---|---|---|---|
| 11,238,699 B2 | 2/2022 | Wingate | |
| 11,276,271 B2 | 3/2022 | Taylor | |
| 11,663,881 B2 | 5/2023 | Palmisano | |
| 2002/0131445 A1* | 9/2002 | Skubic | H04L 63/0407 370/465 |
| 2005/0194827 A1 | 9/2005 | Dowty | |
| 2006/0188389 A1 | 8/2006 | Levy | |
| 2006/0199648 A1 | 9/2006 | Mitchell | |
| 2007/0090335 A1 | 4/2007 | Legrand | |
| 2007/0117604 A1 | 5/2007 | Hill | |
| 2008/0045342 A1 | 2/2008 | Crowder | |
| 2008/0067417 A1 | 3/2008 | Lane | |
| 2008/0134601 A1* | 6/2008 | Cruz | E04B 2/7433 52/236.2 |
| 2008/0178774 A1 | 7/2008 | Saccani | |
| 2008/0305855 A1 | 12/2008 | Czyzewski | |
| 2009/0191933 A1 | 7/2009 | French | |
| 2009/0218512 A1 | 9/2009 | Ranta | |
| 2009/0252646 A1 | 10/2009 | Holden | |
| 2009/0317436 A1 | 12/2009 | Wilson | |
| 2010/0004051 A1 | 1/2010 | Walker | |
| 2010/0312625 A1 | 12/2010 | Miller | |
| 2011/0173574 A1 | 7/2011 | Clavin | |
| 2011/0215261 A1 | 9/2011 | Lyslo | |
| 2011/0227391 A1 | 9/2011 | Cahall | |
| 2011/0256019 A1 | 10/2011 | Gruen | |
| 2011/0306400 A1 | 12/2011 | Nguyen | |
| 2012/0127083 A1 | 5/2012 | Kushler | |
| 2012/0190455 A1* | 7/2012 | Briggs | A63F 13/332 463/42 |
| 2012/0252564 A1 | 10/2012 | Moore | |
| 2013/0023339 A1 | 1/2013 | Davis | |
| 2013/0084991 A1 | 4/2013 | Lemay | |
| 2013/0165232 A1* | 6/2013 | Nelson | G07F 17/3255 463/42 |
| 2013/0225282 A1 | 8/2013 | Williams | |
| 2013/0252713 A1* | 9/2013 | Nelson | G07F 17/3225 463/25 |
| 2013/0303263 A1 | 11/2013 | Lemay | |
| 2014/0015478 A1 | 1/2014 | Von Novak | |
| 2014/0021798 A1 | 1/2014 | Kesler | |
| 2014/0031107 A1 | 1/2014 | Walker | |
| 2014/0203770 A1 | 7/2014 | Salter | |
| 2014/0228109 A1 | 8/2014 | Azuma | |
| 2015/0044098 A1 | 2/2015 | Smart | |
| 2015/0050990 A1 | 2/2015 | Colvin | |
| 2015/0086968 A1 | 3/2015 | Kolavo | |
| 2015/0090903 A1 | 4/2015 | Cole | |
| 2015/0228153 A1 | 8/2015 | Hedrick | |
| 2015/0243133 A1 | 8/2015 | Nicholas | |
| 2015/0254924 A1 | 9/2015 | Pececnik | |
| 2016/0000951 A1 | 1/2016 | Kreiner | |
| 2016/0027244 A1 | 1/2016 | Adiraju | |
| 2016/0027249 A1 | 1/2016 | Nelson | |
| 2016/0029155 A1 | 1/2016 | Kerr | |
| 2016/0073218 A1* | 3/2016 | Shui | H04W 76/14 455/41.2 |
| 2016/0092954 A1* | 3/2016 | Bassett | H04W 4/023 705/26.41 |
| 2016/0098891 A1 | 4/2016 | Eby | |
| 2016/0125319 A1* | 5/2016 | Morgan | G06Q 20/10 705/5 |
| 2016/0133089 A1 | 5/2016 | Roemer | |
| 2016/0180656 A1* | 6/2016 | Loose | G07F 17/3209 463/20 |
| 2016/0183036 A1 | 6/2016 | Tung | |
| 2016/0218545 A1 | 7/2016 | Schroeder | |
| 2016/0234123 A1 | 8/2016 | Alisawi | |
| 2016/0247354 A1 | 8/2016 | Arnone | |
| 2016/0256785 A1 | 9/2016 | Sum | |
| 2016/0282040 A1 | 9/2016 | Wenji | |
| 2016/0283989 A1* | 9/2016 | Esquilla, Jr. | G06Q 30/0281 |
| 2016/0333578 A1 | 11/2016 | Ng | |
| 2016/0349929 A1* | 12/2016 | Clemons | A63F 13/54 |
| 2017/0026788 A1* | 1/2017 | Kostka | G06Q 30/0633 |
| 2017/0076540 A1 | 3/2017 | Saffari | |
| 2017/0076546 A1 | 3/2017 | Walker | |
| 2017/0084086 A1 | 3/2017 | Pio | |
| 2017/0092054 A1 | 3/2017 | Petersen | |
| 2017/0092059 A1 | 3/2017 | Nelson | |
| 2017/0092060 A1 | 3/2017 | Toohey | |
| 2017/0092061 A1 | 3/2017 | Nelson | |
| 2017/0109770 A1 | 4/2017 | Kusens | |
| 2017/0111770 A1* | 4/2017 | Kusens | H04W 4/029 |
| 2017/0169657 A1 | 6/2017 | Keilwert | |
| 2017/0213632 A1 | 7/2017 | Ozana | |
| 2017/0278347 A1 | 9/2017 | Kukita | |
| 2017/0279495 A1 | 9/2017 | Kim | |
| 2017/0289154 A1 | 10/2017 | Krieger | |
| 2017/0346919 A1* | 11/2017 | He | H04W 4/80 |
| 2018/0005484 A1 | 1/2018 | Michel | |
| 2018/0033244 A1 | 2/2018 | Northrup | |
| 2018/0061179 A1 | 3/2018 | Miri | |
| 2018/0075690 A1 | 3/2018 | Moore | |
| 2018/0108213 A1 | 4/2018 | Sanford | |
| 2018/0122185 A1 | 5/2018 | Miller | |
| 2018/0194471 A1 | 7/2018 | Merrick | |
| 2018/0357850 A1 | 12/2018 | Moore | |
| 2019/0066441 A1 | 2/2019 | Lestrange | |
| 2019/0073873 A1 | 3/2019 | Lemay | |
| 2019/0088086 A1* | 3/2019 | Rajendran | H04W 4/025 |
| 2019/0096175 A1 | 3/2019 | Higgins | |
| 2019/0096177 A1 | 3/2019 | Sepich | |
| 2019/0096180 A1 | 3/2019 | Petersen | |
| 2019/0102985 A1 | 4/2019 | Higgins | |
| 2019/0139356 A1 | 5/2019 | Moya | |
| 2019/0151752 A1 | 5/2019 | Kim | |
| 2019/0164384 A1 | 5/2019 | Soukup | |
| 2019/0172300 A1 | 6/2019 | Phillips | |
| 2019/0188951 A1 | 6/2019 | Nelson | |
| 2019/0188955 A1* | 6/2019 | Miri | G07F 17/3255 |
| 2019/0188961 A1 | 6/2019 | Higgins | |
| 2019/0188962 A1 | 6/2019 | Higgins | |
| 2019/0188963 A1 | 6/2019 | Higgins | |
| 2019/0197526 A1 | 6/2019 | Higgins | |
| 2019/0197822 A1 | 6/2019 | Shepherd | |
| 2019/0197830 A1 | 6/2019 | Petersen | |
| 2019/0205866 A1 | 7/2019 | Higgins | |
| 2019/0244476 A1 | 8/2019 | Miltenberger | |
| 2019/0272704 A1 | 9/2019 | Lemay | |
| 2019/0325701 A1 | 10/2019 | Higgins | |
| 2020/0005595 A1 | 1/2020 | Nelson | |
| 2020/0043284 A1 | 2/2020 | Lemay | |
| 2020/0058190 A1 | 2/2020 | Cunningham, II | |
| 2020/0111319 A1 | 4/2020 | Palmisano | |
| 2020/0134973 A1 | 4/2020 | Higgins | |
| 2020/0152005 A1 | 5/2020 | Higgins | |
| 2020/0226881 A1 | 7/2020 | Warner | |
| 2020/0302740 A1 | 9/2020 | Cleveland | |
| 2020/0302746 A1 | 9/2020 | Cleveland | |
| 2021/0019987 A1 | 1/2021 | Cohen | |
| 2021/0241575 A1 | 8/2021 | Shepherd | |
| 2021/0295636 A1 | 9/2021 | Cleveland | |
| 2021/0386201 A1 | 12/2021 | Wilson | |
| 2022/0019950 A1 | 1/2022 | Sabri | |
| 2022/0092908 A1 | 3/2022 | Cleveland | |
| 2022/0148380 A1 | 5/2022 | Wingate | |
| 2022/0319272 A1 | 10/2022 | Shepherd | |
| 2024/0127663 A1 | 4/2024 | Cleveland | |

FOREIGN PATENT DOCUMENTS

| | | |
|---|---|---|
| CA | 2716403 A1 | 9/2009 |
| EP | 0979604 A1 | 2/2000 |
| EP | 3280643 B1 | 4/2020 |
| GB | 2273088 A | 6/1994 |
| GB | 2421217 A | 6/2006 |
| GB | 2421220 A | 6/2006 |
| GB | 2422807 A | 8/2006 |
| GB | 4010756 | 4/2009 |
| KR | 200353613 Y1 | 6/2004 |

(56) References Cited

FOREIGN PATENT DOCUMENTS

| | | |
|---|---|---|
| KR | 20090059283 A | 6/2009 |
| WO | 1999059451 A1 | 11/1999 |
| WO | 2017196732 A1 | 11/2017 |

OTHER PUBLICATIONS

Office Action (Notice of Allowance and Fees Due (PTOL-85)) dated Jul. 26, 2024 for U.S. Appl. No. 18/305,063 (pp. 1-8).
Australian Examination Report No. 1 issued in App. No. AU2019240626, dated Jul. 30, 2024, 3 pages.
Office Action (Notice of Allowance and Fees Due (PTOL-85)) dated Aug. 14, 2024 for U.S. Appl. No. 18/515,051 (pp. 1-8).
Office Action (Non-Final Rejection) dated Sep. 3, 2024 for U.S. Appl. No. 18/419,177 (pp. 1-6).
Australian Examination Report No. 1 issued in App. No. AU2019240623, dated Sep. 6, 2024, 4 pages.
Australian Examination No. 1 issued in App. No. AU2019240628, dated Sep. 7, 2024, 4 pages.
Office Action (Non-Final Rejection) dated Sep. 30, 2024 for U.S. Appl. No. 18/461,249 (pp. 1-13).
Australian Examination Report No. 1 issued in App. No. AU2023258442, dated Oct. 10, 2024, 3 pages.
Office Action (Notice of Allowance and Fees Due (PTOL-85)) dated Dec. 10, 2024 for U.S. Appl. No. 18/305,063 (pp. 1-5).
Office Action (Notice of Allowance and Fees Due (PTOL-85)) dated Dec. 10, 2024 for U.S. Appl. No. 18/419,177 (pp. 1-8).
Australian Examination Report No. 1 for App. No. AU2022204879, dated Sep. 7, 2023, (1-3 pages).
Office Action (Notice of Allowance and Fees Due (PTOL-85)) dated Oct. 2, 2023 for U.S. Appl. No. 17/347,321 (pp. 1-6).
Office Action dated Sep. 25, 2020 for U.S. Appl. No. 16/264,875 (pp. 1-12).
Office Action dated Nov. 2, 2020 for U.S. Appl. No. 16/586,168 (pp. 1-7).
Notice of Allowance dated Dec. 2, 2020 for U.S. Appl. No. 16/586,246 (pp. 1-10).
Office Action dated Dec. 2, 2020 for U.S. Appl. No. 16/586,356 (pp. 1-7).
Notice of Allowance dated Jan. 7, 2021 for U.S. Appl. No. 16/264,875 (pp. 1-7).
Notice of Allowance dated Feb. 11, 2021 for U.S. Appl. No. 16/586,127 (pp. 1-15).
Notice of Allowance dated Feb. 12, 2021 for U.S. Appl. No. 16/586,168 (pp. 1-5).
International Search Report and Written Opinion for App. No. PCT/US19/53823, dated Jan. 3, 2020, 10 pages.
AU Examination Report for AU Application No. 2018204598, dated Mar. 20, 2019. 5 pages.
Corrected Notice of Allowability dated Apr. 14, 2021 for U.S. Appl.No. 16/586,127 (pp. 1-2).
Notice of Allowance dated Apr. 13, 2021 for U.S. Appl. No. 16/586,356 (pp. 1-5).
Australian Examination Report No. 1 for App. No. AU2020204407, dated Mar. 23, 2021, 4 pages.
Notice of Allowance dated Apr. 29, 2021 for U.S. Appl. No. 16/586,168 (pp. 1-5).
Eddystone format, https://developers.google.com/beacons/eddystone, printed Feb. 3, 2021, 9 pages.
RadBeacon Serial Port Interface, v3.2.3, 56 pages.
Notice of Allowance dated May 26, 2021 for U.S. Appl. No. 16/586,246 (pp. 1-5).
Office Action (Notice of Allowance and Fees Due (PTOL-85)) dated Sep. 9, 2021 for U.S. Appl. No. 16/947,987 (pp. 1-8).
Office Action (Non-Final Rejection) dated Nov. 10, 2021 for U.S. Appl. No. 16/585,838 (pp. 1-13).
Office Action (Notice of Allowance and Fees Due (PTOL-85)) dated Nov. 22, 2021 for U.S. Appl. No. 17/220,778 (pp. 1-8).
Office Action (Non-Final Rejection) dated Mar. 8, 2022 for U.S. Appl. No. 17/262,178 (pp. 1-9).
Office Action (Notice of Allowance and Fees Due (PTOL-85)) dated Mar. 4, 2022 for U.S. Appl. No. 16/585,838 (pp. 1-7).
Office Action (Notice of Allowance and Fees Due (PTOL-85)) dated May 18, 2022 for U.S. Appl. No. 17/262,178 (pp. 1-7).
Notice of Allowance dated Jun. 24, 2022 for U.S. Appl. No. 29/734,939 (pp. 1-10).
"Shields for Casino Slots" Apr. 28, 2020, ReviewJournal, visited Jun. 7, 2022: https://www.reviewjournal.com/business/(casinos-gaming/las-vegas-firm-creates-safety-shields-for-use-at-casino-slots-tables-2016807/ (Year:2020).
"SuzoHapp" Jan. 14, 2020, GGRASIA, site visited Jun. 7, 2022: https://www.ggrasia.com/ suzohapp-offers-acrylic-dividers-for-gaming-venues/ (Year:2020).
"Protective Separators" Oct. 22, 2020, Needs Info Including URL Starting With veb.archive.org/ (Year: 2020).
Stabile, Angelica, "Las Vegas startup creates coronavirus self-cleaning slot machine dividers" May 5, 2020, Fox Business, site visited Jun. 9, 2022: https://www.foxbusiness.com/technology/las-vegas-company-coronavirus-slot-machine-dividers (Year:2020).
Office Action (Notice of Allowance and Fees Due (PTOL-85)) dated Aug. 16, 2022 for U.S. Appl. No. 17/211,521 (pp. 1-8).
Australian Examination Report No. 1 issued in App. No. AU2021202860, dated Jul. 19, 2022, 3 pages.
Office Action (Notice of Allowance and Fees Due (PTOL-85)) dated Sep. 23, 2022 for U.S. Appl. No. 17/262,178 (pp. 1-7).
Office Action (Non-Final Rejection) dated Nov. 8, 2022 for U.S. Appl. No. 17/343,344 (pp. 1-7).
Office Action (Notice of Allowance and Fees Due (PTOL-85)) dated Nov. 16, 2022 for U.S. Appl. No. 17/211,521 (pp. 1-8).
Office Action (Non-Final Rejection) dated Dec. 6, 2022 for U.S. Appl. No. 17/352,049 (pp. 1-8).
Office Action (Non-Final Rejection) dated Dec. 30, 2022 for U.S. Appl. No. 17/351,920 (pp. 1-8).
Office Action (Non-Final Rejection) dated Jan. 17, 2023 for U.S. Appl. No. 17/347,321 (pp. 1-22).
Office Action (Non-Final Rejection) dated Jan. 23, 2023 for U.S. Appl. No. 17/368,393 (pp. 1-6).
Office Action (Notice of Allowance and Fees Due (PTOL-85)) dated Jan. 20, 2023 for U.S. Appl. No. 17/362,486 (pp. 1-8).
Office Action (Notice of Allowance and Fees Due (PTOL-85)) dated Jan. 23, 2023 for U.S. Appl. No. 17/362,530 (pp. 1-9).
Office Action (Notice of Allowance and Fees Due (PTOL-85)) dated Jan. 30, 2023 for U.S. Appl. No. 17/362,486 (pp. 1-2).
Office Action (Notice of Allowance and Fees Due (PTOL-85)) dated Feb. 1, 2023 for U.S. Appl. No. 17/362,530 (pp. 1-2).
Office Action (Non-Final Rejection) dated Feb. 9, 2023 for U.S. Appl. No. 17/674,672 (pp. 1-6).
Office Action (Notice of Allowance and Fees Due (PTOL-85)) dated Feb. 21, 2023 for U.S. Appl. No. 17/351,920 (pp. 1-5).
Office Action (Notice of Allowance and Fees Due (PTOL-85)) dated Mar. 13, 2023 for U.S. Appl. No. 17/343,344 (pp. 1-5).
Office Action (Final Rejection) dated Mar. 17, 2023 for U.S. Appl. No. 17/219,634 (pp. 1-15).
Office Action (Notice of Allowance and Fees Due (PTOL-85)) dated Mar. 27, 2023 for U.S. Appl. No. 17/352,049 (pp. 1-5).
Office Action (Non-Final Rejection) dated Apr. 7, 2023 for U.S. Appl. No. 17/647,568 (pp. 1-6).
Office Action (Non-Final Rejection) dated Apr. 25, 2023 for U.S. Appl. No. 17/491,348 (pp. 1-12).
Office Action (Notice of Allowance and Fees Due (PTOL-85)) dated May 18, 2023 for U.S. Appl. No. 17/368,393 (pp. 1-5).
Office Action (Final Rejection) dated May 26, 2023 for U.S. Appl. No. 17/347,321 (pp. 1-26).
Office Action (Notice of Allowance and Fees Due (PTOL-85)) dated Jun. 8, 2023 for U.S. Appl. No. 17/219,634 (pp. 1-7).
Office Action (Notice of Allowance and Fees Due (PTOL-85)) dated Jun. 28, 2023 for U.S. Appl. No. 17/674,672 (pp. 1-8).
Office Action dated Apr. 29, 2020 for U.S. Appl. No. 16/264,875 (pp. 1-8),.
Office Action (Non-Final Rejection) dated Jul. 25, 2023 for U.S. Appl. No. 18/061,979 (pp. 1-6).

(56) References Cited

OTHER PUBLICATIONS

Office Action (Notice of Allowance and Fees Due (PTOL-85)) dated Aug. 22, 2023 for U.S. Appl. No. 17/647,568 (pp. 1-8).
Office Action (Notice of Allowance and Fees Due (PTOL-85)) dated Sep. 20, 2023 for U.S. Appl. No. 17/491,348 (pp. 1-5).
Office Action (Notice of Allowance and Fees Due (PTOL-85)) dated Nov. 22, 2023 for U.S. Appl. No. 17/941,493 (pp. 1-8).
Office Action (Notice of Allowance and Fees Due (PTOL-85)) dated Nov. 27, 2023 for U.S. Appl. No. 18/061,979 (pp. 1-8).
Office Action (Notice of Allowance and Fees Due (PTOL-85)) dated Nov. 30, 2023 for U.S. Appl. No. 17/647,568 (pp. 1-2).
Office Action (Non-Final Rejection) dated Jan. 2, 2024 for U.S. Appl. No. 17/243,279 (pp. 1-14).
Office Action (Notice of Allowance and Fees Due (PTOL-85)) dated Feb. 8, 2024 for U.S. Appl. No. 17/819,523 (pp. 1-7).
Office Action (Notice of Allowance and Fees Due (PTOL-85)) dated Feb. 15, 2024 for U.S. Appl. No. 18/061,979 (pp. 1-8).
Office Action (Non-Final Rejection) dated Jun. 4, 2024 for U.S. Appl. No. 18/515,051 (pp. 1-7).
Australian Examination Report No. 1 issued in App. No. AU2020223786 dated May 23, 2025, 3 pages.
Office Action dated Jul. 15, 2025 for U.S. Appl. No. 18/327,695 (pp. 1-17).

\* cited by examiner

SYSTEM AND METHOD FOR CHANGING BEACON IDENTIFIERS FOR SECURE MOBILE COMMUNICATIONS

CROSS-REFERENCE TO RELATED APPLICATIONS

This application is a continuation of and claims priority to U.S. patent application Ser. No. 17/819,523, filed Aug. 12, 2022, which is a continuation of U.S. patent application Ser. No. 17/262,178, now U.S. Pat. No. 11,488,441, filed Jan. 21, 2021, which claims priority to International Application No. PCT/US2019/053823, filed Sep. 30, 2019, which claims priority to U.S. Provisional Patent Application No. 62/742,034, filed Oct. 5, 2018, each of which are incorporated herein by reference in its entirety.

TECHNICAL FIELD

The field of disclosure relates generally to casino gaming, and more particularly to systems and methods for providing changing beacon identifiers (IDs) for secure mobile communications.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

For conventional table games, such as blackjack, roulette, craps, poker, and so forth, players typically exchange personal funds for casino chips, which may then be used to place wagers at the table games. Chips may be acquired from a designated exchange point in the casino ("the cage"), or they may be acquired at the table games themselves. Traditionally, when a player wishes to acquire chips at a table game, the player lays cash on the table surface and alerts the dealer that they would like to acquire additional chips ("cash in"). The dealer takes and counts the players cash (e.g., $100), removes a number of chips from a chip stock (e.g., an inventory "float" of chips) on the table (e.g., twenty $5 chips), and gives those chips to the player in exchange for the cash. In some situations, the dealer may display the cash and the chips to a table surveillance camera (e.g., "eye in the sky"), and may make a hand signal to indicate to the camera the nature or significance of the event. The player may then use those chips at the table over the course of a gaming session. When the player wishes to conclude their gaming session, they pick up their chips and vacate their position at the table. Conventional casinos are not configured to allow the player to exchange chips back to the dealer for cash. Instead, the player must take their chips to the cage to redeem for cash ("cash out").

BRIEF DESCRIPTION

In one aspect, a system is provided. The system includes a casino management server configured to generate beacon identifiers (IDs). The system also includes an electronic casino device. The electronic casino device includes a beacon configured to wirelessly communicate with personal devices of players. The electronic casino device also includes at least one processor executing instructions. The instructions cause the at least one processor to transmit a request for a custom beacon ID to the casino management server. The instructions also cause the at least one processor to receive the custom beacon ID from the casino management server in response to the request. The instructions further cause the at least one processor to configure the beacon with the custom beacon ID, thereby broadcasting the custom beacon ID to the personal device of the player. The casino management server is further configured to receive, from the personal device of the player, a pairing request that includes a received beacon ID as received by the personal device based on the broadcasting. The casino management server is also configured to validate that the received beacon ID matches the custom beacon ID. The casino management server is further configured to store a valid association between the personal device of the player and the electronic casino device. The casino management server is also configured to authorize one or more connected actions to be performed by the personal device based on the valid association between the personal device and the electronic casino device.

In another aspect, a non-transitory computer-readable medium embodying computer-executable instructions thereon is provided. When executed by at least one processor, the instructions cause the at least one processor to receive, from an electronic casino device, a request for a unique beacon identifier (ID). The instructions also cause the at least one processor to generate the unique beacon ID. The instructions further cause the at least one processor to transmit the unique beacon ID to the electronic casino device for broadcast by a wireless beacon of the electronic casino device to a personal device of a player. The instructions also cause the at least one processor to receive, from the personal device of the player, a pairing request that includes a received beacon ID as received by the personal device based on the broadcasting. The instructions further cause the at least one processor to validate that the received beacon ID matches the unique beacon ID. The instructions also cause the at least one processor to store a valid association between the personal device of the player and the electronic casino device. The instructions further cause the at least one processor to authorize one or more connected actions to be performed by the personal device based on the valid association between the personal device and the electronic casino device.

In yet another aspect, a computer-implemented method for wirelessly communicating between an electronic casino device and a personal device of a player is provided. The method includes generating a request for a custom beacon identifier (ID). The method also includes receiving the custom beacon ID in response to the request. The method further includes configuring a beacon of the electronic casino device with the custom beacon ID, thereby broadcasting the custom beacon ID to the personal device of the player. The method also includes receiving, by a central server from the personal device of the player, a pairing request that includes a received beacon ID as received by the personal device based on the broadcasting. The method further includes validating, by the central server, that the received beacon ID matches the custom beacon ID. The method also includes authorizing one or more connected actions to be performed by the personal device based on the valid association between the personal device and the electronic casino device.

BRIEF DESCRIPTION OF THE DRAWINGS

An example embodiment of the subject matter disclosed will now be described with reference to the accompanying drawings.

DETAILED DESCRIPTION

Typical wireless beacons using technologies such as near-field communications (NFC) or Bluetooth® typically have a static beacon identifier (ID) that is transmitted by the beacon to nearby devices during connectivity operations. The beacon ID may be used to uniquely identify the beacon (e.g., amongst other nearby beacons). Such beacon IDs may be configured during manufacturing.

A wireless beacon and associated systems and methods are described herein for providing changing beacon IDs to improve communication security between personal mobile devices of casino patrons (e.g., players) and various casino devices such as electronic gaming machines (EGMs), smart tables, and kiosks. In one embodiment, wireless beacons with changeable beacon IDs are installed within EGMs on the casino floor. A player may use their personal device (e.g., mobile phone) to connect to a particular EGM and its associated beacon ID to facilitate various functionality between the EGM and the player's personal device during a gaming session. During connection setup, the EGM's beacon requests a new beacon ID from a supporting backend system, such as a casino management system. The casino management system generates a new, unique beacon ID and sends the beacon ID to the beacon of the EGM. The beacon changes its beacon ID to the new beacon ID and uses that ID to pair with the player's personal device. The personal device provides a personal device ID and player authentication credentials to the casino management system, which authenticates both the personal device and the player. Upon successful authentication, the player and their personal device are successfully paired with the EGM and the various functionality provided by the EGM or remote services is allowed. The configurable, non-static nature of the IDs for the beacons of the casino devices enhances security from certain types of hacking by introducing dynamic ID generation and use for one-time pairing. During the next pairing attempt, the EGM will receive a new, different ID, and thus will not advertise the same ID through more than one pairing.

Figure 1:
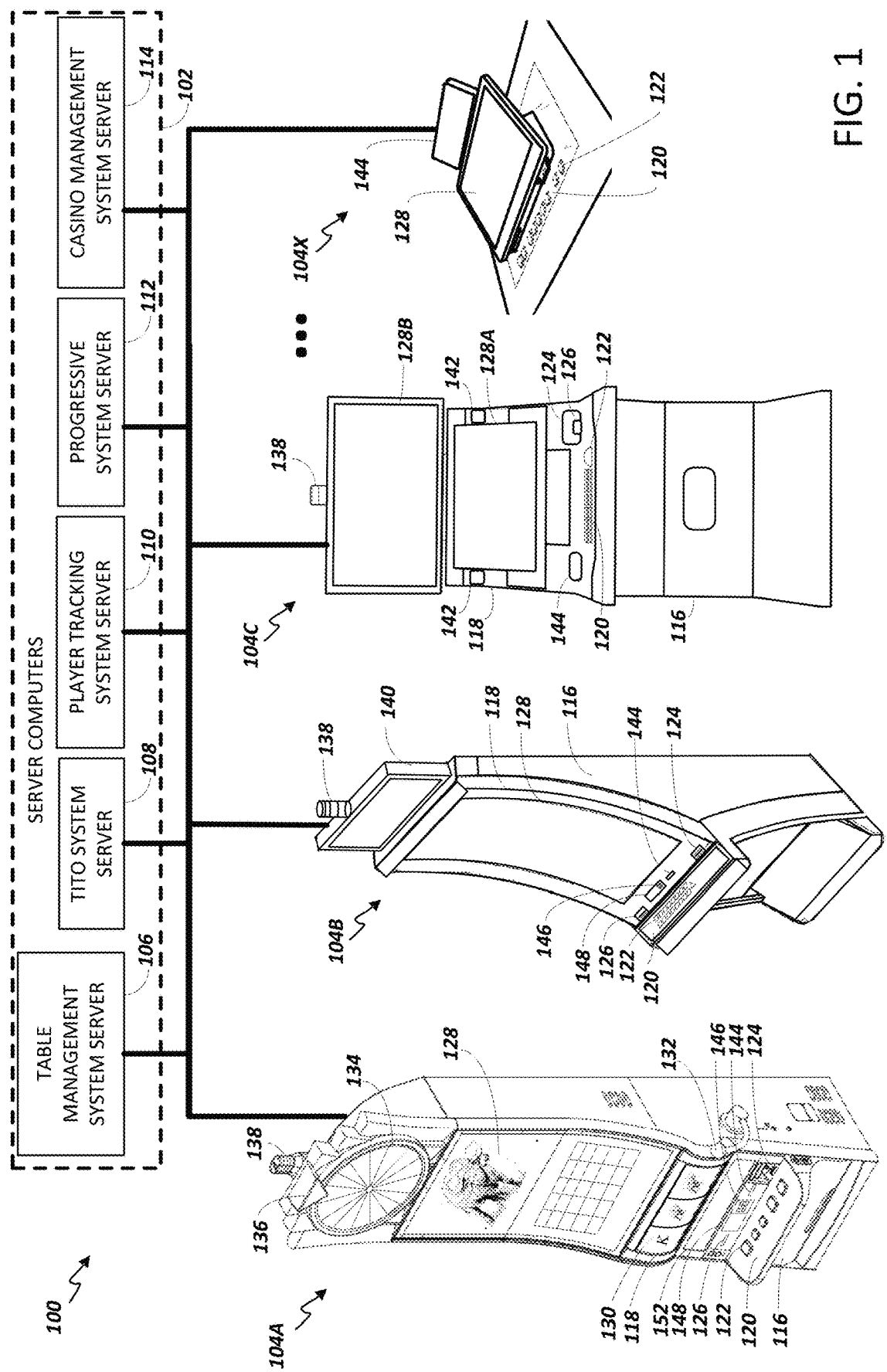
FIG. 1 is a diagram of exemplary EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
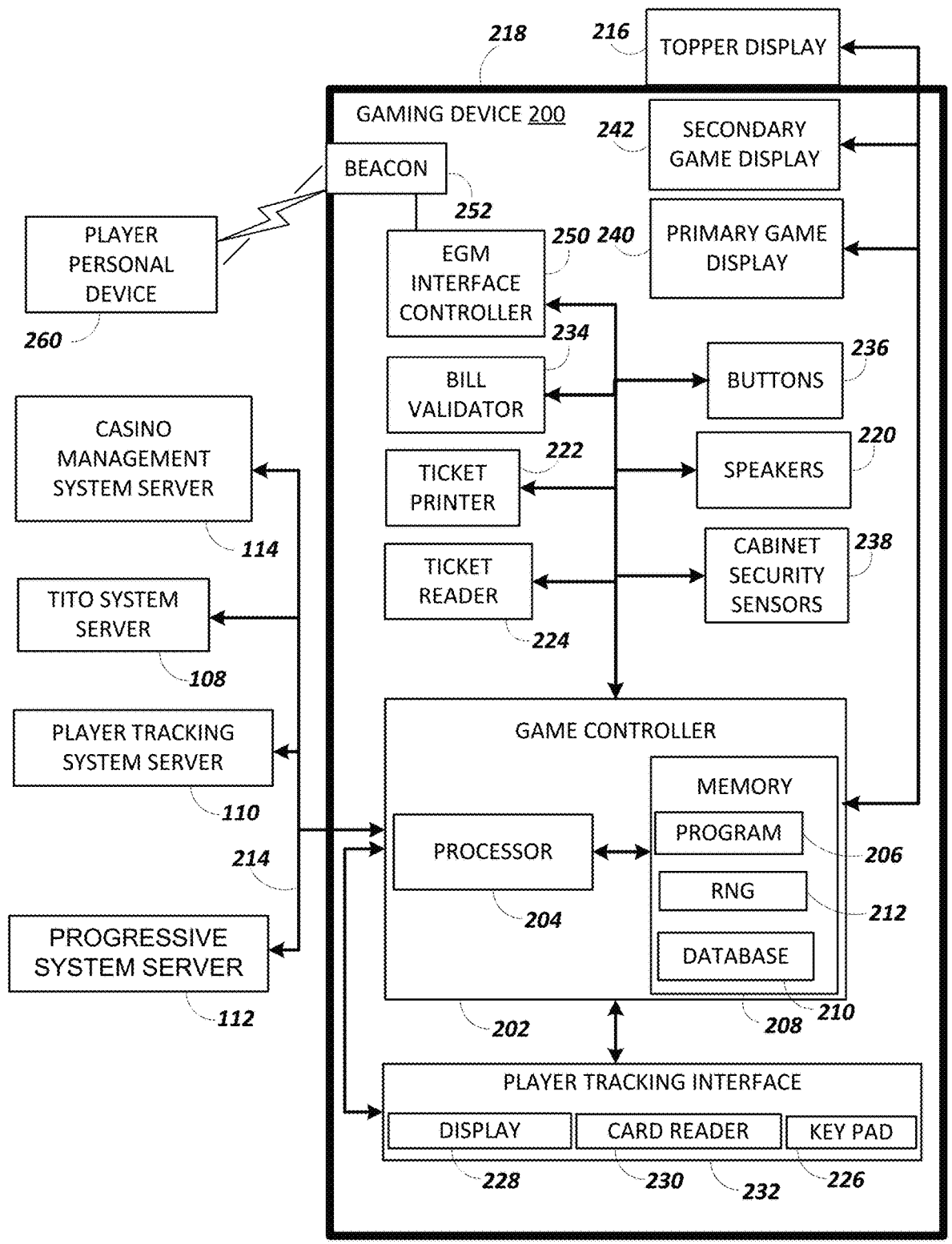
FIG. 2 is a block diagram of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Yet another example gaming device 104X is a tabletop or bar top gaming device that may provide many different types of games, including, for example, mechanical slot games, video slot games, video poker, video black jack, video pachinko, keno, bingo, and lottery. Each gaming device 104 may also be operable to provide many different games. Games may be differentiated according to themes, sounds, graphics, type of game (e.g., slot game vs. card game vs.

game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server. The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

In the example embodiment, the gaming device 200 also includes an EGM interface controller 250 and a wireless beacon 252 configured to establish wireless communication between the gaming device 200 and nearby personal devices (or "mobile devices") 260 of players. In some embodiments, the beacon 252 may utilize near-field communication (NFC) or Bluetooth® to pair with a personal device 260. In one example embodiment, the gaming device 200 uses a Bluetooth beacon such as those made commercially available by Radius Networks, Inc. (headquartered in Washington, D.C.) (e.g., "RadBeacon USB"). The beacon 252 is able to be configured, by the EGM interface controller 250, with a changeable beacon ID that is used when establishing connectivity between the beacon 252 and the personal device 260. During operation, in some embodiments, the beacon 252 may detect that there is a personal device 260 nearby and available for a wireless connection. Upon detection of the nearby personal device 260, the EGM interface controller 250 may transmit a beacon ID request to the casino management system server 114. The casino management system server 114 generates a new ID ("custom beacon ID") for the beacon 252 and transmits that beacon ID back to the gaming device 200. The custom beacon ID may be uniquely generated (e.g., relative to other beacon IDs being used in other EGMs at the casino's property), and may use output from an RNG to generate the beacon ID. The EGM interface controller 250 reconfigures the beacon 252 to use the custom beacon ID. Once the custom beacon ID is configured, the beacon 252 establishes a pairing with the personal device 260, thereby allowing wireless connectivity between the personal device 260 of the player and allowing the various functionality permitted by the gaming device 200 or other networked services to be made available to the personal device 260 on the network 214.

Figure 3:
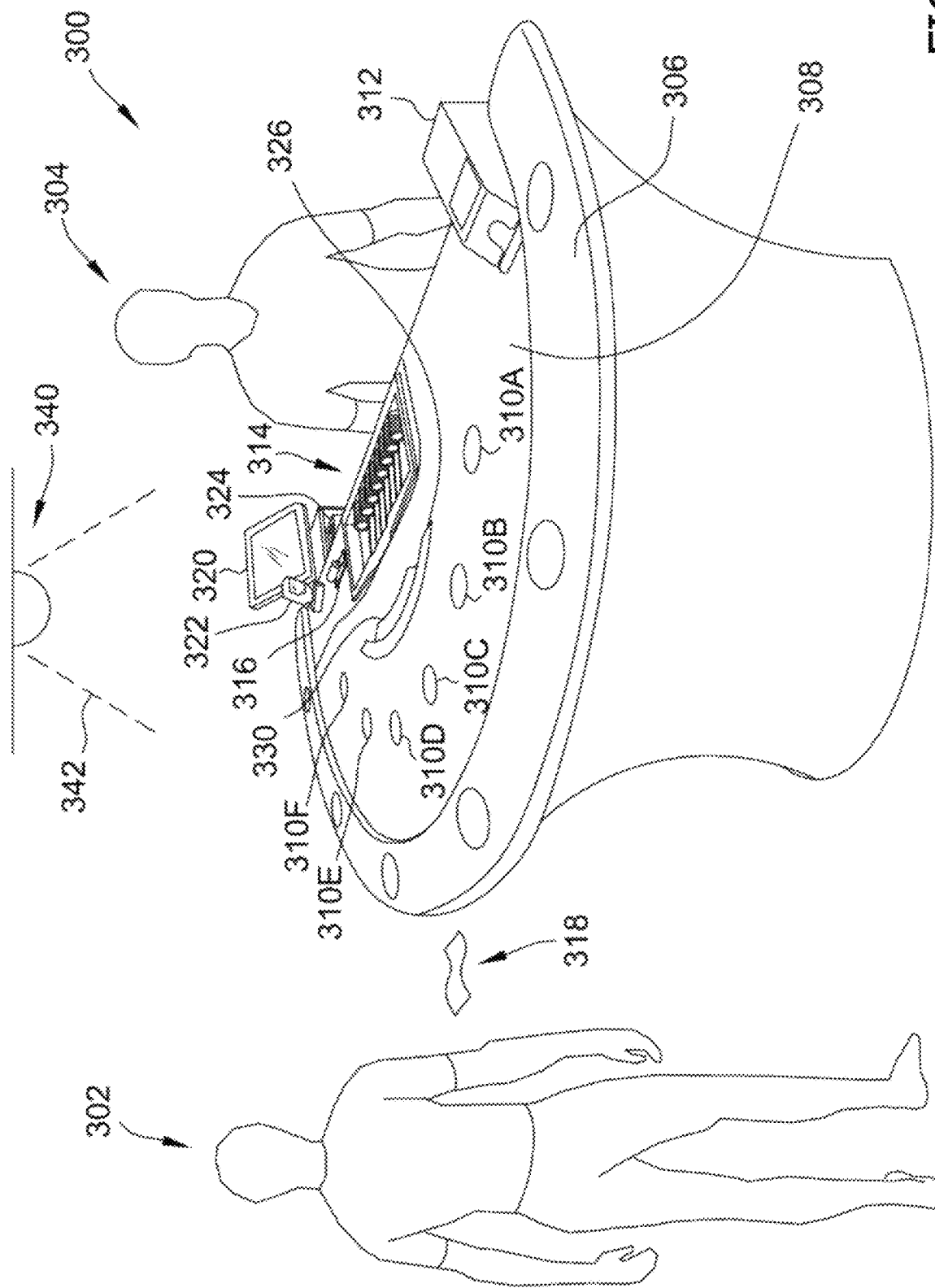
FIG. 3 is a diagram of an example smart table used for table gaming in a casino environment.

FIG. 3 is a diagram of an example smart table 300 used for table gaming in a casino environment. The smart table 300, in the example embodiment, includes several player positions, generally represented here by betting areas 310A-310F (collectively, "betting areas 310) (e.g., one betting area 310 per active player). In this example table game, players 302 typically stand or sit near their betting area 310 and place wagers (e.g., chips) within the betting area 310 during the course of play. Betting areas 310 are typically visually marked on a table surface (or just "surface") 308 of the table 300, such as by circles as shown here. The smart table 300 also includes a card shoe 312 from which a dealer 304 dispenses cards during the course of play. In addition, the dealer 304 collects and dispenses chips from a chip inventory maintained in a chip tray 314. The smart table 300 also includes a drop box 316 into which the dealer may deposit cash, tickets, or other items. Further, in some table games, the table surface 308 may include an insurance bar 326 or other such visually-demarcated areas used for the particular table game. Other common table surface areas and hardware may be present but are not illustrated here for purposes of clarity (e.g., automatic card shuffling device, card return tray, additional betting areas, and so forth).

In the example embodiment, the smart table 300 also includes electronic components of or otherwise used by the table ticketing system. A table management device 320 includes a display and a user interface (both not separately depicted in FIG. 3) through which the dealer 304 or casino management (e.g., pitboss) may interface with the table ticketing system or other systems such as the casino management system or the player tracking system. The table management device 320 is communicatively attached to a ticket scanner (or "voucher scanner") device 322 that may be used to scan the tickets 318 presented by players 302 (e.g., during a ticket-in event). A printing device (or just "printer") 324 is attached to the table management device 320, and may be used to generate new tickets 318 (e.g., during a "ticket-out" or chip redemption event, or as a partial reimbursement from a ticket-in event). The table management device 320, in some embodiments, is configured to communicate with a table management system (not separately shown) operated by the casino to manage aspects of table games.

In some embodiments, the smart table 300 is configured with one or more chip sensors. In this example, the smart table 300 is configured with one or more radio-frequency identification ("RFID") readers (not separately shown) embedded within (e.g., just underneath the surface 308 of) the table 300. Further, the chips are each embedded with RFID tags that may be sensed and read by the readers. The particular placement and configuration of each of the RFID sensors establishes or otherwise creates RFID areas (or "sensing areas") on the table surface 308 within which chips may be placed and read (e.g., counted for total value) for that particular RFID area. The various RFID sensors provided by the smart table 300 may be configured such as to establish non-overlapping RFID areas. When a particular RFID area does not overlap with any other RFID areas, the chip detection by that associated RFID sensor is isolated from other sensors such that those chips may be considered to be solely within a significant region of the table 300.

In the example embodiment, one RFID area provided by the smart table 300 is a dealer scratchpad 330. In FIG. 3, the dealer scratchpad 330 is visually identified by markings on the table (e.g., an enclosed region identifying where the dealer 304 may put chips when using the dealer scratchpad 330). This visual region also approximately defines the configuration of an underlying RFID reader (not separately depicted) under the table surface 308 300, as well as an associated RFID area within which chips may be detected and associated with that area. During operation, the dealer scratchpad 330 may be used to determine a value of chips being dispensed to the player 302 during a ticket-in event (e.g., to verify against a value of the ticket 318), or to determine a value of chips being collected from the player 302 during a ticket-out event (e.g., to establish a value for a ticket to be printed).

In some embodiments, another RFID reader may be provided that defines an RFID area for the chip tray 314. Such an RFID area allows aspects of chip tracking to and from the chip tray 314. In some embodiments, various player-oriented RFID readers may be provided within the table 300 that define RFID areas used individually by each of the players 302. For example, the smart table 300 may include RFID readers that define RFID areas for each of the betting areas 310. As such, the value of chips placed within the betting areas 310 for each player may be automatically determined on demand. In some embodiments, additional play areas (not shown) associated with the play of the table game may be similarly defined by associated RFID readers. Further, in some embodiments, the smart table 300 may include RFID readers that define RFID areas for each player 302's chip inventory (not shown) (e.g., the chips of the player 302 on the table 300 but not currently being used by the player 302). For example, player inventory areas may be defined on the table 300 and approximately adjacent to an interior edge of an arm rest rail 306, where players 302 conventionally maintain their own chip inventories.

In the example embodiment, the smart table 300 is monitored by a security camera (or just "camera") 340 (e.g., a digital video camera). The camera 340 has a field of view 342 of the table surface 308, and transmits video, still images, or other digital image information to a casino surveillance system (not separately shown). The camera 340 may be used to generally monitor aspects of play at the table 300, and may additionally integrate with the table ticketing system to capture digital image information during the various table ticketing events described herein. The camera 340 may sometimes be referred to as the "eye in the sky."

Figure 4:
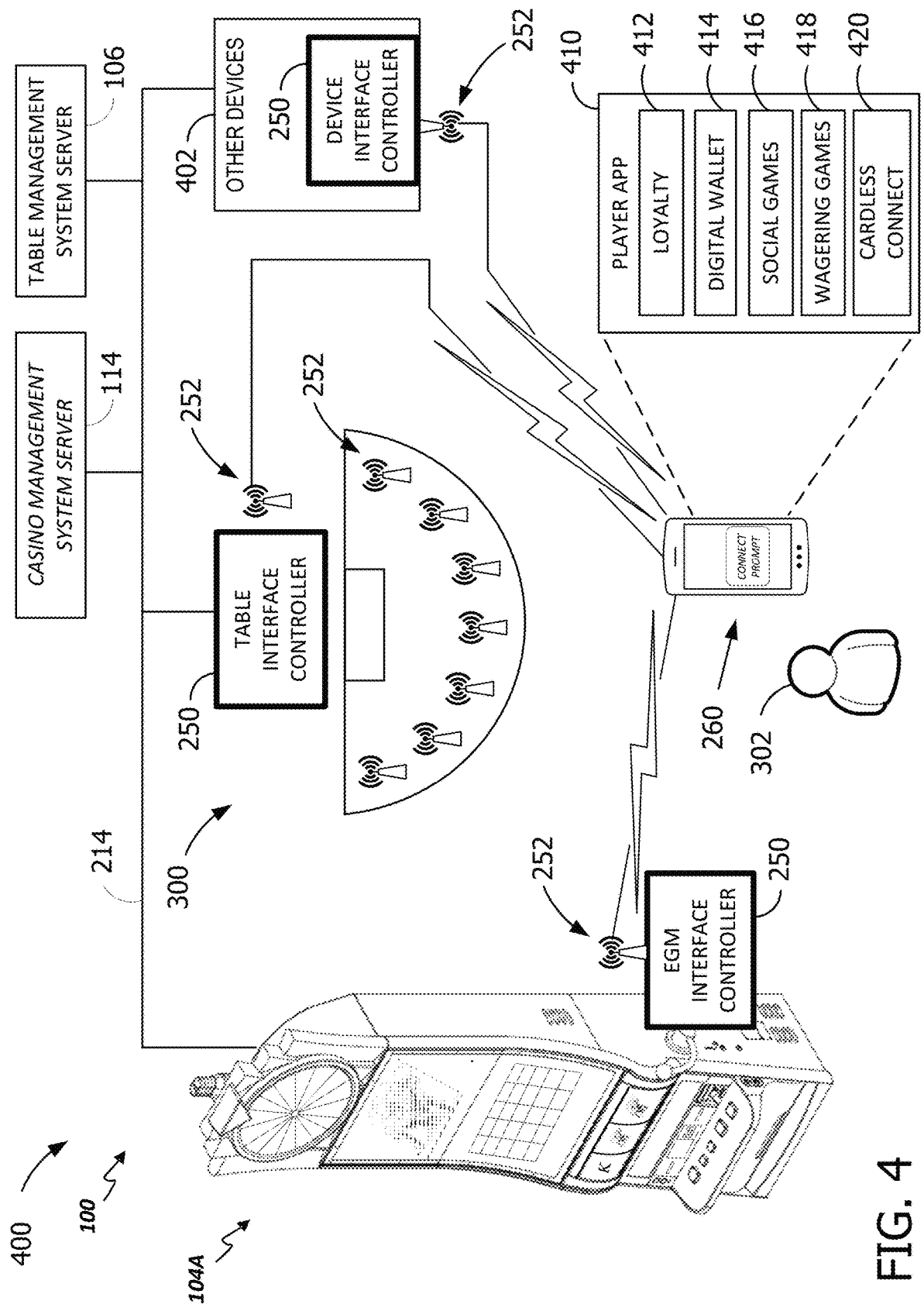
FIG. 4 is a diagram of various electronic devices on a casino property, each of which are enabled with wireless beacons and interface controllers that enable wireless communication between that particular device and mobile computing devices of casino patrons.

In some embodiments, the player 302 has a digital wallet app (or just "digital wallet" 414, shown in FIG. 4) installed on or otherwise facilitated by their personal device 260 (e.g., as a component of a player application, or "player app" 410, shown in FIG. 4). In some embodiments, the player app 410 may include the digital wallet 414 or may otherwise interact with a third-party digital wallet app to facilitate various embodiments described herein. The digital wallet 414 may contain payment account information for various personal bank accounts and payment cards (e.g., debit cards, credit cards) of the player 302 from which the player 302 may withdraw or deposit funds, and may also contain loyalty card information for the player 302 (e.g., associated with the player tracking system of the casino). Further, in some embodiments, the player tracking system or other back-end system operated by the casino operator may maintain a financial account on behalf of the player 302 and may allow the player to deposit funds into or withdraw funds from that personal casino account (e.g., as another source of funds).

In some embodiments, the table management system, or the table 300 itself, may include one or more digital camera devices (not shown) that are positioned such as to capture front views of the seated or standing players at or near the table 300. Such digital video may be used for facial recognition applications by the table management system. For example, the table management system may perform facial recognition on people sitting at the various player positions provided by the table, allowing the table management system to automatically detect which known players are sitting at each player position. In some embodiments, facial recognition may be used to verify the identity of the active players at the table 300 or secondary players standing near the table 300 for purposes of authenticating identity of a player as they log into the table management system.

In some embodiments, the smart table 300 and table management system may include one or more beacons (e.g., beacon 252) and a table interface controller 250 (shown in FIG. 4) within or otherwise near the table 300 that enables the table management system to use wireless communications (e.g., NFC, Bluetooth®) to detect the presence and position of personal devices of the players at the table 300. In the example embodiment, each position at the table 300 includes a beacon 252 dedicated for use by that position. For example, the table 300 may include a beacon 252 inset beneath the surface 308 of the smart table 300 and near the railing 306 within each player position (e.g., as shown in FIG. 4). In an attempt to minimize connections with any other players except the player sitting at that particular position, these player position beacons 252 may be configured with limited range (e.g., one inch, two inches, five inches, one foot, based on signal strength configuration of the beacons 252). Further, to facilitate such limited connections, the table 300 may include an area marker (not shown) on the surface 308 of the table at each position and near each position beacon 252, thereby providing a visual indication of where the player 302 at that position should place their mobile device 260 for best connectivity. In some embodiments, the smart table 300 may include a plug-in or surface charger for each player position, allowing the players to charge their personal devices, and also allowing another mechanism to detect the presence of particular players at particular player positions, or for other communications between the players' personal devices and the table management system.

FIG. 4 is a diagram of a cardless connection system 400 in which various electronic devices on a casino property are enabled with wireless beacons 252 and interface controllers 250 that enable wireless communication between that particular "target" device and mobile computing devices (e.g., personal device 260) of casino patrons (e.g., player 302). In the example embodiment, the casino has numerous electronic gaming devices 104 (e.g., slot machines, video slot or video poker machines, and so forth), smart tables 300, and may also have other wireless-enabled devices 402, such as TITO ticket exchange kiosks. The example EGM 104A includes the EGM interface controller 250 and beacon 252. The smart table 300 also includes one or more table interface controllers 250 and associated beacon(s) 252. Other electronic devices 402 within the casino property (e.g., kiosks, cashier stations at a cashier desk) may also include their own device controllers 250 and associated beacons 252.

In the example embodiment, each of the interface controllers 250 allows players at or near their respective underlying devices 104A, 300, 402 to wirelessly connect to those devices 104A, 300, 402, and may allow functionality or other connectivity to backend services provided on network 214. In some embodiments, the beacons 252 may utilize a personal area network protocol, such as Bluetooth®, to connect to the personal devices 260 of players. In some embodiments, the beacons 252 may utilize near-field communications (NFC) for wireless connectivity with the personal devices 260, perhaps including a designated area within which the player places their personal device 260 to facilitate connectivity. Such connectivity may be used, for example, to establish player identity at the device 104, 300, 402 (e.g., loyalty identification of the player 302, or "carding in" to the device), perform digital wallet transactions with the device 104, 300, 402, establish player location of the player 302, track game play data of the player 302 (e.g., for a loyalty system), or establish and maintain "tethering" between the player 302 and the paired device (e.g., to verify continued presence of the player 302 for maintaining a gaming session). Further, beacons 252 may be physically or wirelessly connected to a local area network, such as a public network (e.g., local Wi-Fi network) or a private network (e.g., network 214) to facilitate connectivity to various servers 102.

In the example embodiment, the player 302 installs a player app 410 on their personal device 260. The player app 410 provides a loyalty component 412, a digital wallet component 414, a social games component 416, a wagering games component 418, and a cardless connection component 420. For example, the player app 410 may be used to establish cardless connection with gaming devices 104, smart tables 300, or other devices 260 through the cardless connection component 420, to perform digital wallet transactions (e.g., cash-in, cash-out), or to enter into rated session play under their loyalty ID. The social games component 416 provides various social games that may be played by the player 302 on their personal device 260 (e.g., using virtual currencies, or other non-wagering game play). The wagering games component 418 provides various wagering games that may be played by the player 302 on their personal device 260 (e.g., using various real currencies via their digital wallet or other player accounts). Wagering games may require the player 302 to be within at a physical venue of an operator, which may be determined and verified by GPS location data of the mobile device 260 and geofencing.

To establish cardless connection with a nearby device, in the example embodiment, when in standby mode (e.g., when not connected to a personal device 260), each of the beacons 252 is configured to operate as a stateless device advertising no beacon identifier or, in some embodiments, a static or broadcast beacon identifier. Further, the beacons 252 are also configured to reprogram their beacon ID, thus allowing the beacons 252 to be configured with custom beacon IDs. The casino management system server 114, table management system server 106, or other server 102, manages aspects of connectivity between devices 104A, 300, 402 and the personal devices 260 of patrons. More specifically, the casino management system server 114 acts as a centralized manager of connection requests, providing beacon IDs to the beacons 252 during connection setup.

During operation, the player 302 may initiate a connectivity request (e.g., an inquiry scan) to connect with the target device (e.g., EGM 104, table 300, other device 402) from their personal device 260. For example, the player 302 may select a connection prompt button in the player app 410 to begin pairing with the target device. The beacon 252 of the target device, at this time, has no beacon ID. However, the beacon 252 does detect the connectivity request from the personal device 260. Upon detection of the connectivity request, the interface controller 250 of the target device transmits a beacon ID request to the CMS server 114. The CMS server 114 generates a custom beacon ID for the beacon 252 (e.g., randomly, uniquely) and associates that custom beacon ID both with the target device (e.g., a unique device identifier for the EGM 104A, smart table 300, or other device 402) as well as with the particular personal device 260 of the player 302 (e.g., based on a unique device identifier of the personal device 260). The personal device 260 of the player 302 may also be identified and authenticated by the CMS server 114, such as comparing the device ID of the requesting personal device 260 with a stored device ID database, or via player credentials, such as a player app ID, loyalty ID and associated password or other authentication method (e.g., biometric, facial recognition, or such). Upon successful authentication, the CMS server 114 transmits a custom beacon ID to the requesting target device.

The interface controller 250 receives the custom beacon ID and configures the beacon 252 with that new beacon ID. The custom beacon ID is then used to pair with the personal device 260 of the player 302 (e.g., via a link level authentication). The player 302 is then prompted to enter their login credentials, which allows the target device and CMS server 114 to authenticate the player (e.g., at an application level authentication).

In some embodiments, the CMS server 114 may associate the requesting personal device 260 with the login ID of the player 302. Upon successful authentication, the interface controller establishes a secure connection between the personal device 260 and the target device and, as such, can commence session communication.

In some embodiments, once connected, the target device may provide various services directly to the personal device 260, or may provide a communications gateway through to various services provided on the backend network 214. For example, the paired connectivity may allow the player to transfer credit, points, comps, or other marketing or hard currencies from or to the devices 104A, 300, 402 (e.g., via digital wallet or other transaction transfer). The paired connectivity may allow the player to establish a social or wagering gaming session, enter into a sports wagering session, or a virtual gaming session. The paired connectivity may allow the player to reserve the target device or pause their gaming session to be resumed later (e.g., maintaining state while they step away from the EGM 104A to eat or use the restroom). The paired connectivity may allow the devices 104A, 300, 402 to provide a personalized device experience through, for example, settings, game type selections, game theme selections, or monetary preferences associated with the player. The paired connectivity may allow the player to enter into social group communications, enter into communitive gaming sessions, or enter into remote wagering sessions.

While this player continues to be in the paired session with the target device, the beacon 252 does not accept new connections and, in some embodiments, may discontinue transmitting the custom beacon ID, i.e. either transmitting no beacon ID or a static beacon ID. As such, another player attempting to connect to the interface controller 250 of the target device will not see the beacon 252, and thus cannot connect to the target device until the existing pairing is cancelled. In some embodiments, if another player attempts to connect to the target device while the previous paired session is still active, the beacon 252 may cancel that previous paired connection and return to the standby state (e.g., without a beacon ID). For example, the original paired player may move to another EGM near the original EGM 104A, but perhaps not far enough away to lose connectivity on the original pairing. When another player attempts to pair with the EGM 104A, the beacon 252 terminates the original pairing and returns to the standby state, which then allows the beacon 252 to request a new beacon ID that can be used to pair with the new player's device. As such, stale pairings may be terminated by this process, which causes the beacon 252 to acquire a new beacon ID for the next pairing.

In some embodiments, the target device may detect a disconnection of the personal device 260 from the beacon 252 (e.g., player 302 walks too far away from the beacon 252, player 302 causes disconnection via the player app, dealer 304 or EGM 104 disconnects player 302, beacon 252 loses power, or such). Upon disconnection, the target device transmits an unpairing message to the CMS server 114 indicating an unpairing of the player 302 (e.g., their personal device 260) from the target device. The target device may unpair the personal device 260 from the beacon 252 and may unconfigure the custom ID from the beacon 252 and may reconfigure the beacon 252 to broadcast a default broadcast ID. The CMS server 106 may update a record of the player positioning (e.g., within the table management database 1320) to virtually remove the player 302 from the target device based on the unpairing.

When the personal device 260 of the player disconnects with the EGM 104A, the beacon 252 returns to a standby state and advertises no beacon ID. When another player attempts to pair with the EGM 104A, the beacon 252 again requests a new beacon ID for pairing with that new player's device. As such, the beacons 252 of each of the devices 104A, 300, 402 effectively implement changing beacon IDs, which are provided on demand and at the time of the connectivity attempt by the CMS server 114.

Figure 5:
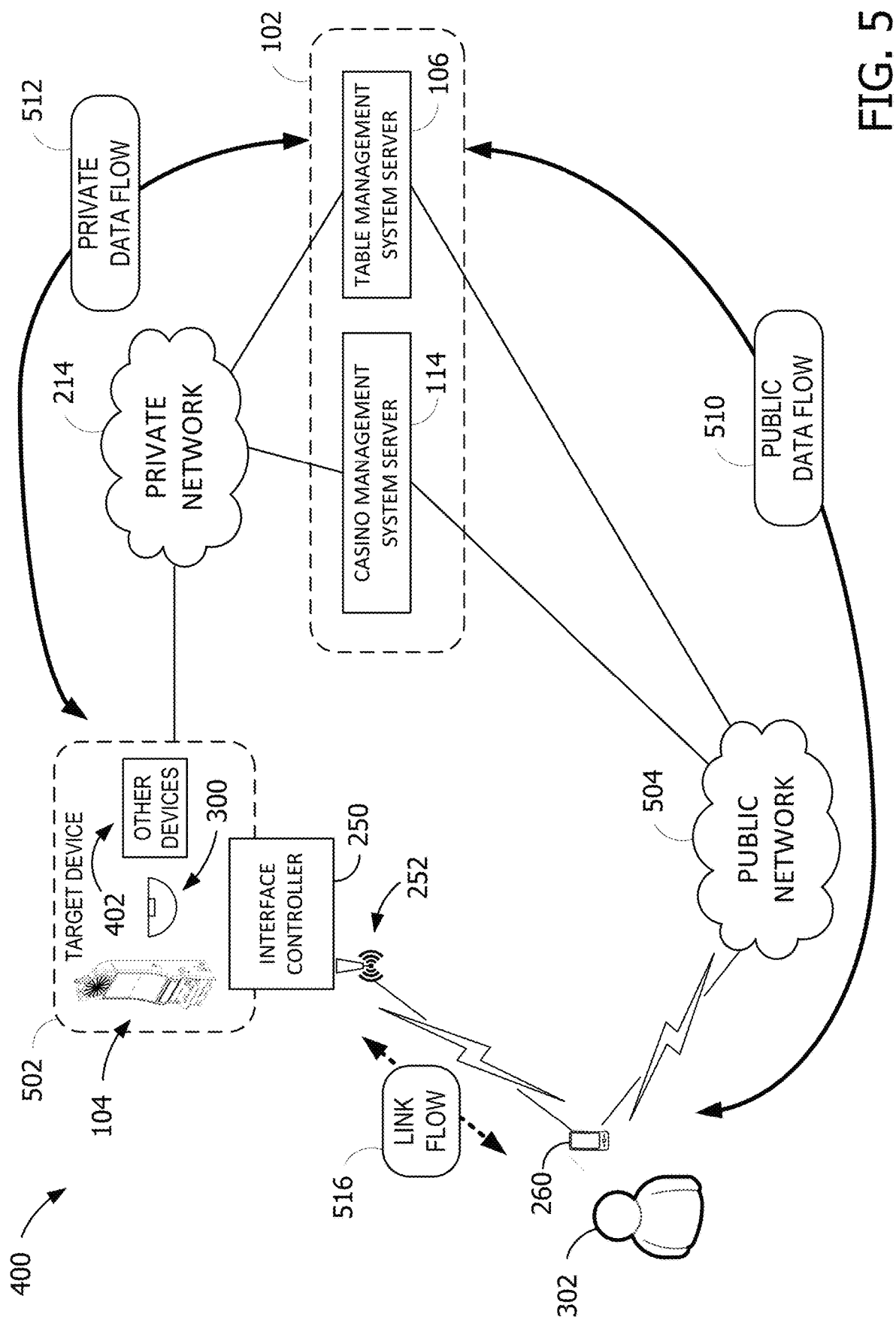
FIG. 5 is an example networked environment depicting aspects of connectivity and data flow between the mobile device and a target device within the cardless connection system.

FIG. 5 is an example networked environment 500 depicting aspects of connectivity and data flow between the mobile device 260 and a target device 502 within the cardless connection system 400. The target device 502 may be an EGM 104, a smart table 300, or one of the other devices 402, having an interface controller 250 and wireless beacon 252 (e.g., Bluetooth beacon) as described above. In the example embodiment, the player app 410 may interact with the cardless connection system 400 for various purposes, such as cardless connection (e.g., "carding in" to establish loyalty identity at EGMs 104 or smart tables 300), digital wallet interaction (e.g., cashing into or out of EGMs 104 or smart tables 300, performing transactions, redeeming stored rewards, or such), interacting with a loyalty system, or various other functions. However, the data flow for such interactions between the personal device 260, the servers 102, and the target devices 502 are restricted by the cardless connection system 400. The target device 502 establishes a wireless connection with the personal device 260 of the player 302 (e.g., Bluetooth pairing) for purposes of establishing, and perhaps maintaining, link connectivity (e.g., for purposes of device verification, tethering, or such) (e.g., represented here as a link flow 516), but the target device 502 may be configured to not receive or process higher level data directly with the personal device 260. Rather, higher level data transmitted between personal device 260 and the servers 102 or target devices 502 of the example networked environment may be passed from the personal device 260 across a public network 504, and possibly a private network 214, to the servers 102 (e.g., represented in bolded line as a public data flow 510) and from the servers 102 across the private network to and from the target device 502 (e.g., represented in bolded line as a private data flow 512).

In various embodiments described herein, the player 302 establishes wireless connectivity between their personal device 260 and the target device 502 via the beacon 252. The cardless connection system 400 may allow the target device 502 to interact with the mobile device 260, but may limit the connectivity and types of information that may be passed across the link flow 516. In some embodiments, the cardless connection system 400 may limit communications between the beacon 252 and the personal device 260 based on protocol stack level (e.g., OSI layer, or such) of communications. For example, in the instance of the beacon 252 being a Bluetooth beacon, the target device 502 (e.g., the interface controller 250) may restrict communications to just Bluetooth Link Controller or Link Manager layers of communication or lower, or may restrict communications to all Bluetooth layers below the Applications layer. In some embodiments, the target device 502 may be configured to only perform link-related communications (e.g., establish or disconnect a wireless link, test connectivity of an existing link, or such) between the beacon 252 and the personal device 260, and direct all other network traffic out to private network 214. In such embodiments, link flow 516 includes only link-level operations and associated data. In other embodiments, the target device 502 may allow only unidirectional transmission of application layer data across the link flow 516, allowing application data to be sent out from the target device 502 but not allowing application data to be received by the target device 502 across that link flow 516.

Figure 6:
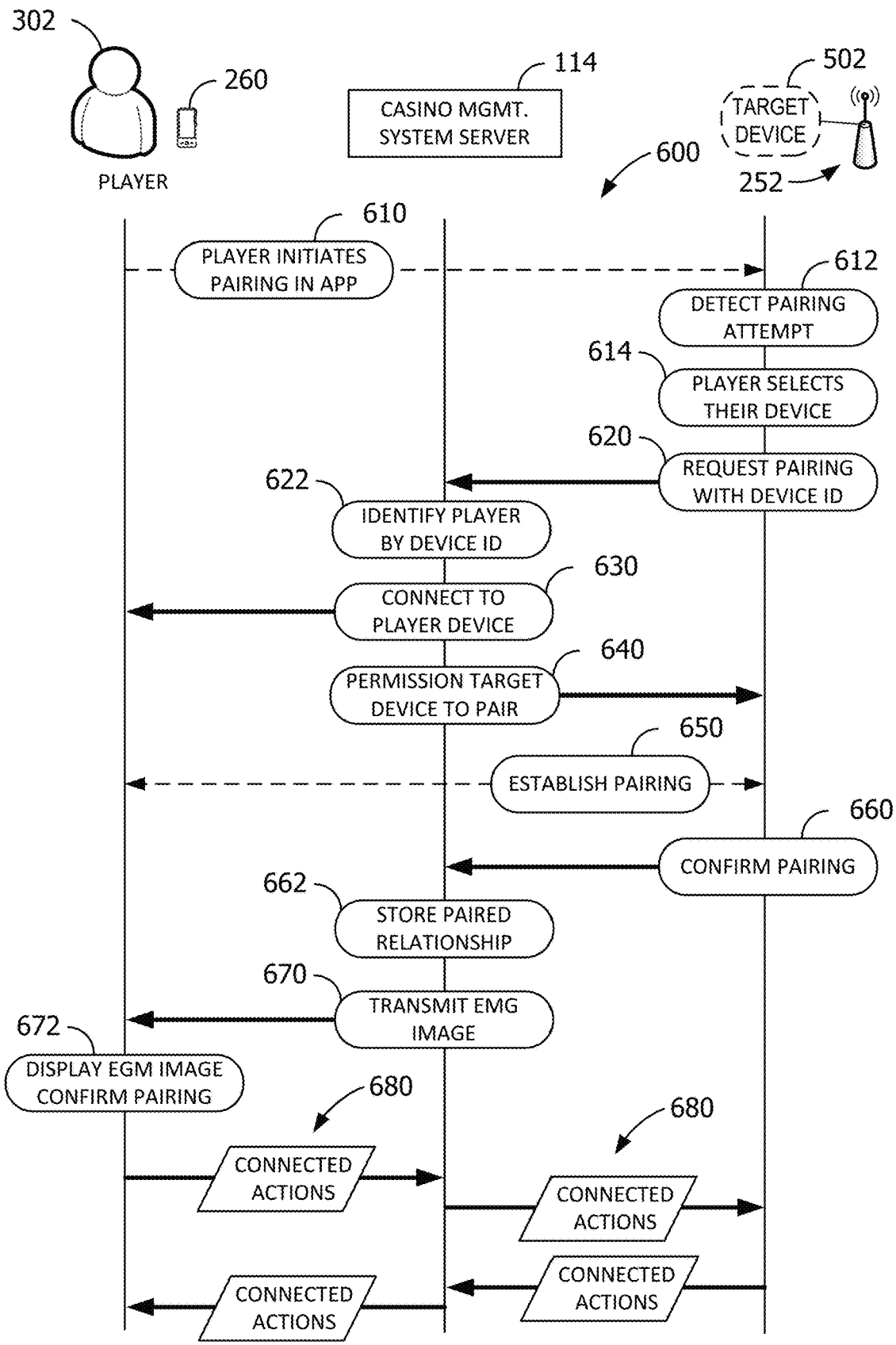
FIG. 6 is a swim lane diagram illustrating one example connection process between the personal device of the player, the casino management system server (or other server), and the target device.
Figure 7:
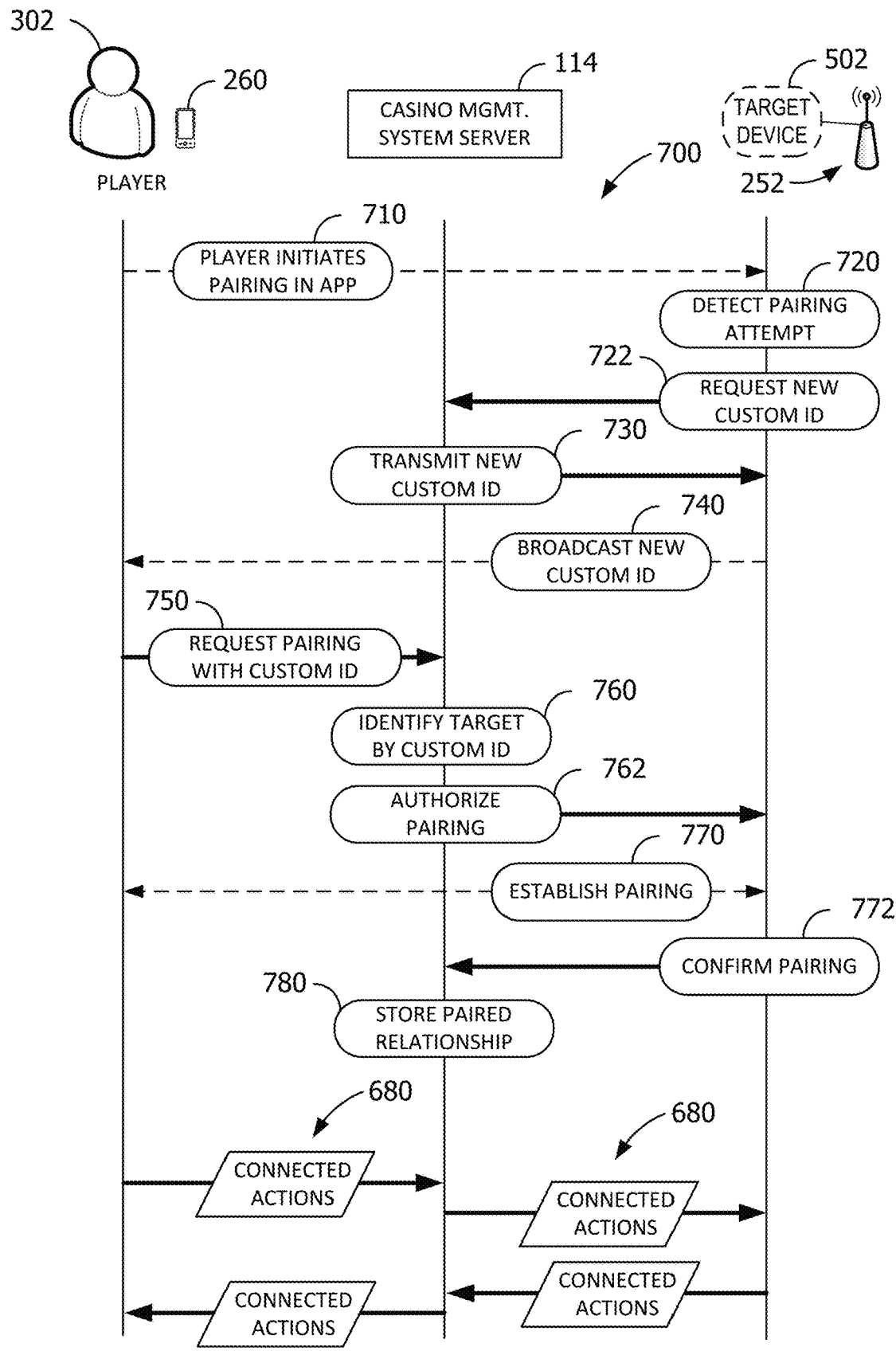
FIG. 7 is a swim lane diagram illustrating another example connection process between the personal device of the player, the casino management system server (or other server 102), and the target device.
Figure 8:
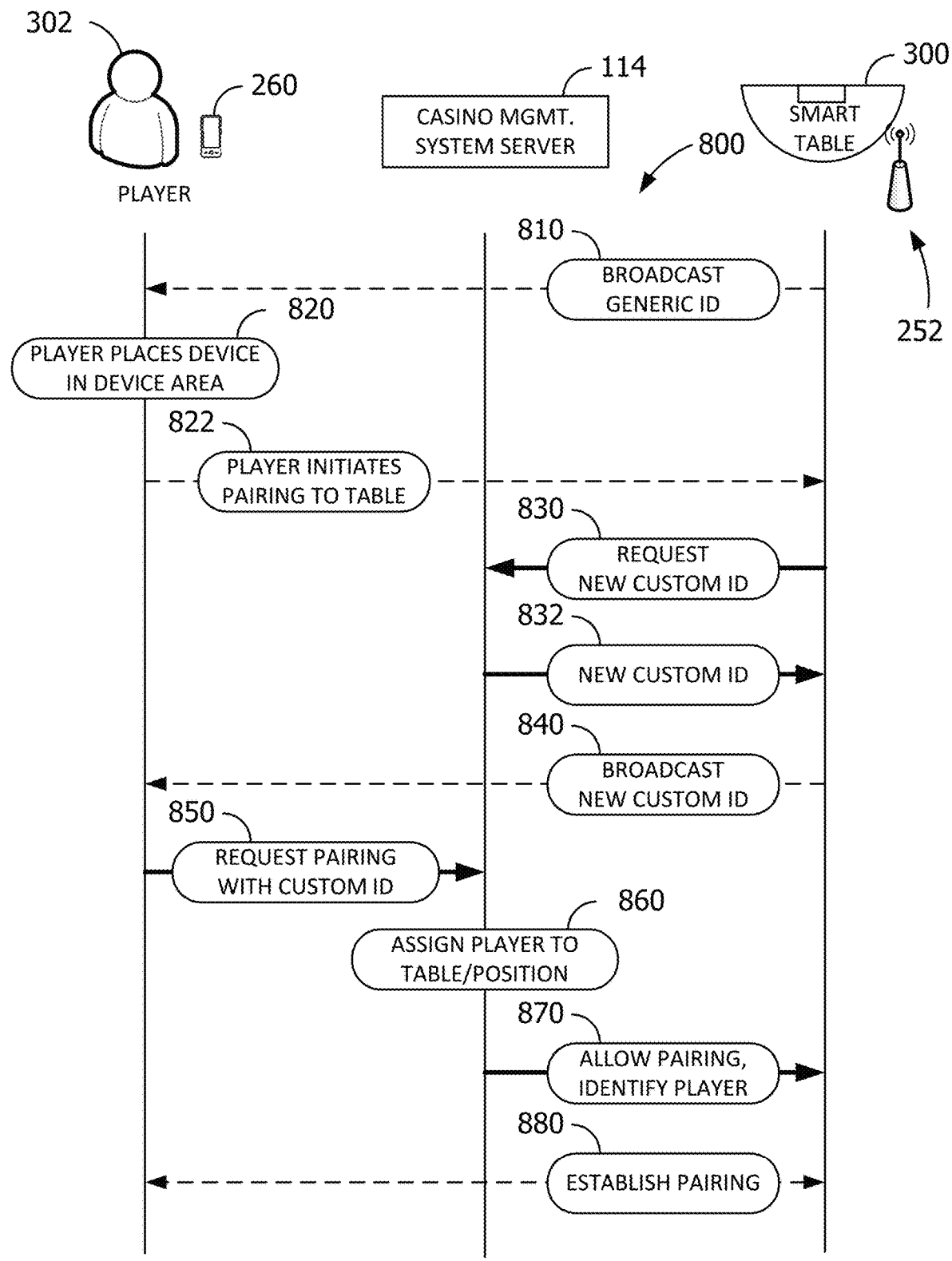
FIG. 8 is a swim lane diagram illustrating a cardless connection process between the personal device of the player, the casino management system server, and components of the smart table.

These various restrictions to communications across the link flow 516 allows for certain wireless communications directly between the target device 502 and the personal device 260 of players 302, but protects from a potential vector of attack by limiting how the wireless connection is used. FIGS. 6-8 describe various connection protocols associated with establishing connectivity between the personal device 260 and the target device 502.

FIG. 6 is a swim lane diagram illustrating one example connection process 600 between the personal device 260 of the player 302, the casino management system server 114 (or other server 102), and the target device 502. In the example shown here, connectivity across the link flow 516 (e.g., between the target device 502 and the personal device 260) is illustrated in broken line and connectivity across public network 504 and private network 214 (e.g., between the personal device 260 and the casino management system server 114, or between the casino management system server 114 and the target device 502) is illustrated in heavy line. In the example embodiment, the target device 502 includes a beacon 252 for wireless connectivity to the personal device 260 of the player, as well as a display device (e.g., game displays 240, 242, or such) that allows the player 302 to view digital content displayed by the target device 502.

In the example embodiment, process 600 begins when the player 302 has their personal device 260 within range of the beacon 252 of the target device 502 and the player 302 initiates a pairing attempt within the player app 410 (e.g., via the cardless connect component 420). For example, the player 302 may be standing in front of an EGM 104 when they begin the pairing process. Upon pairing initiation, at operation 610, the personal device 260 begins broadcasting its own device ID ("wireless device ID", e.g., Bluetooth device name, unique address, or such). The target device 502 automatically scans for and detects the nearby device and receives the device ID of the personal device 260 from the broadcast. In some embodiments, the player 302 may need to prompt the target device 502 to scan for nearby devices (e.g., via options on the display of the target device 502). At operation 612, the target device 502 displays device IDs of nearby devices and allows the player to select their own device from the list. At operation 614, the player 302 identifies and selects their own device on the display of the target device 502 (e.g., based on knowledge of their own device ID).

Upon device selection, in the example embodiment, the target device 502 then transmits a pairing request message to the casino management system server 114 at operation 620. The pairing request message includes selected device ID of the personal device 260 and a device identifier of the target device ("target device ID", e.g., uniquely identifying the target device 502 from other devices managed by the casino management system server 114). At operation 622, the casino management system server 114 receives the pairing request message and identifies the player 302 based on their device ID. In the example embodiment, the casino management system server 114 maintains a list of known device IDs and associated player information. For example, during installation or registration of the player app 410 onto the personal device 260, the player 302 may register their device 260 with the casino management system server 114, providing their wireless device ID and other player profile information (e.g., loyalty ID, player name, physical device ID, mobile phone number, network address, and such). As such, if the casino management system server 114 is able to identify the player 302 and their personal device 260 based on the selected device ID, the casino management system server 114 attempts to connect with the player device 260 at operation 630 (e.g., over the public network 504). In some embodiments, the player 302 may be prompted to confirm the pairing attempt on their personal device 260 (e.g., to ensure someone else is not attempting an unauthorized pairing attempt). In some embodiments, the player device 260 may set an internal state to "attempting pairing" at operation 610 and, upon receiving the connection attempt at operation 630, may automatically transmit an acknowledgment that the device 260 is currently attempting a pairing. In some embodiments, the player 302 may be prompted to provide, or the personal device 260 may automatically provide, authentication credentials (e.g., username, password, biometric, or other personal authentication data).

In the example embodiment, if the personal device 260 of the player 302 is confirmed to be attempting to pair, then the casino management system server 114 transmits a pairing authorization message to the target device 502 at operation 640. The pairing authorization message or a subsequent message may include additional information about the pairing, such as additional device information of the personal device 260 or additional player information about the player 302. At operation 650, upon receipt of the pairing authorization message, the target device 502 establishes pairing with the personal device 260. In some embodiments, establishing pairing may also require a confirmation on the personal device 260 (e.g., by a prompt within the player app 410). Once pairing has been confirmed between the personal device 260 and the target device 502, the target device 502 transmits a pairing confirmation message to the casino management system server 114 at operation 660. In some embodiments, the personal device 260 may additionally or alternatively transmit a pairing confirmation message to the casino management system server 114. At operation 662, the casino management system server 114 stores a record of the active pairing (e.g., in a database). The pairing record may include device information of the personal device 260, player information of the player 302, or device information of the target device 502. In some embodiments, upon confirmation of the pairing, the casino management system server 114 may transmit an image of or otherwise associated with the target device 502 to the personal device 260, and the personal device 260 (e.g., the player app 410) may display the image of the target device 502 to provide additional confirmation to the player 302 that pairing has been successful and a visual indicator of the target device 502 (e.g., for player assurance).

Once connection has been established, in the example embodiment, no application layer data is transmitted directly from the personal device 260 into the target device 502 (e.g., over link flow 516). In some embodiments, application layer data may even be prohibited directly from the target device 502 to the personal device 260. Rather, any actions that involve the personal device 260 and the target device 502 (e.g., "connected actions" 680) are instead performed through the casino management system server 114 or other server 102 (e.g., over private network 214 or public network 504). For example, a digital wallet request to transfer cash into the target device for $100 from a play account in the digital wallet may be initiated from the player app 410 and sent to the casino management system server 114 for processing. When the transaction is otherwise verified and authorized, the casino management system server 114 may transmit an instruction to credit the target device 502 with $100 in credits to conclude the transaction. As such, the personal device 260 does not perform such communications directly with the target device 502.

In some embodiments, the target device 502 or the personal device 260 may perform monitoring activities or communications over the link flow 516 while the pairing connection remains established. For example, the target device 502 may periodically send ping or other status requests to the personal device 260 to ensure that the pairing is still established (e.g., to ensure that the devices 260, 502 are still within range, powered on, communicating with each other, and such). If the target device 502 detects a loss of pairing with the personal device 260, or vice versa, the target device 502 may transmit a disconnection message to the casino management system server 114, causing the pairing record to be updated as disconnected or deleted from the database.

FIG. 7 is a swim lane diagram illustrating another example connection process 700 between the personal device 260 of the player 302, the casino management system server 114 (or other server 102), and the target device 502. In the example embodiment, the process 700 provides dynamic beacon IDs for the beacon 252 of the target device 502 and may not require player interaction with the target device 502 to complete pairing. In the example shown here, connectivity across the link flow 516 (e.g., between the target device 502 and the personal device 260) is illustrated in broken line and connectivity across public network 504 and private network 214 (e.g., between the personal device 260 and the casino management system server 114, or between the casino management system server 114 and the target device 502) is illustrated in heavy line. In the example embodiment, the target device 502 includes a beacon 252 for wireless connectivity to the personal device 260 of the player.

In the example embodiment, process 700 begins when the player 302 has their personal device 260 within range of the beacon 252 of the target device 502 and the player 302 initiates a pairing attempt within the player app 410 (e.g., via the cardless connect component 420). For example, the player 302 may be standing in front of an EGM 104 when they begin the pairing process. Upon pairing initiation, at operation 710, the personal device 260 begins broadcasting its own device ID ("wireless device ID", e.g., Bluetooth device name, unique address, or such). In the example embodiment, the target device 502 automatically scans for and detects the nearby device, at operation 720, and receives the device ID of the personal device 260 from the broadcast. In some embodiments, the player 302 may need to prompt the target device 502 to scan for nearby devices (e.g., via options on the display of the target device 502). In some embodiments, in lieu of operation 720, the player 302 may manually cause the target device 502 to request a new custom ID by, for example, selecting a button on the primary display device 240 of the target device 502. In some embodiments, the target device 502 may not scan for or detect nearby devices. For example, within operation 710, the target device 502 may broadcast a beacon ID (e.g., a static or custom beacon ID) which is detected by the player app 410 on the personal device 260 and communicated to the casino management system server 114. In such embodiments, the player 302 may press a button on the target device 502 (e.g., a "Connect" button) to begin the request for the custom beacon ID of operation 722.

At operation 722, the target device 502 transmits a beacon ID request to the casino management system server 114, requesting a new custom beacon ID (or just "custom ID"). The custom ID request includes a unique device identifier for the beacon 252 ("beacon device ID"). The casino management system server 114 or other server 102 may store device identifiers for the various beacons 252 that are managed, and may associated each of the unique beacon device IDs with particular target devices 502, thereby allowing the casino management system server 114 to uniquely identify with which target device 502 the request is associated (e.g., via association between unique device ID, smart table ID, and position ID at that smart table). The new custom ID request may also include a device ID for the personal device 260. The beacon 252 is configured to allow a dynamic reconfiguration of the beacon ID, allowing the beacon 252 to change IDs during operation (e.g., to facilitate secure connections). At operation 730, the casino management system server 114 generates a new custom ID (e.g., based on an output of the RNG 212), stores an association of that new custom ID with the target device 502, and optionally the player device ID, and transmits that new custom ID to the target device 502. In some embodiments, the new custom ID is generated to be unique amongst a pool of wireless beacon devices (e.g., multiple beacons 252) managed by the casino management system server 114. At operation 740, the target device 502 reconfigures the beacon 252 with the custom ID and broadcasts that new custom ID back to the personal device 260 of the player 302. In some embodiments, the target device 502 (e.g., the interface controller 250) may generate the new custom ID. In such embodiments, the target device 502 may also transmit the custom ID to the casino management system server 114 for later confirmation during subsequent steps in the pairing process described herein.

At operation 750, the personal device 260 receives the new custom ID from the beacon 252 and transmits a pairing request to the casino management system server 114. The pairing request identifies the identity of the player 302 (e.g., via loyalty ID, personal device ID, app ID, or such) as well as the new custom ID received from the beacon 252. At operation 760, the casino management system server 114 determines with which target device 502 the pairing request is associated (e.g., based on the received new custom ID) and may authenticate the identity of the personal device 260 (e.g., based on comparing the device ID of the request with the stored personal device ID associated with the new custom ID). In some embodiments, the casino management system server 114 may determine an identity of the player 302 (e.g., based on a player account name, a loyalty account ID, a mobile device ID of the mobile device 604), and may provide player identification and other profile information on the player 302 to the target device 502. If the request 1550 is authenticated, the casino management system server 114 transmits a pairing authorization message to the target device 502 authorizing pairing with the personal device 260 at operation 762. The authorization message may also provide the identity of the player 302 (e.g., loyalty ID, app ID, or such) and other player information of the player 302 to the target device 502. At operation 770, the target device 502 establishes pairing with the personal device 260.

Once pairing has been confirmed between the personal device 260 and the target device 502, the target device 502 transmits a pairing confirmation message to the casino management system server 114 at operation 772. In some embodiments, the personal device 260 may additionally or alternatively transmit a pairing confirmation message to the casino management system server 114. At operation 780, the casino management system server 114 stores a record of the active pairing (e.g., in a database). The pairing record may include device information of the personal device 260, player information of the player 302, or device information of the target device 502. In some embodiments, upon confirmation of the pairing, the casino management system server 114 may transmit an image of or otherwise associated with the target device 502 to the personal device 260, and the personal device 260 (e.g., the player app 410) may display the image of the target device 502 to provide additional confirmation to the player 302 that pairing has been successful and a visual indicator of the target device 502 (e.g., for player assurance). In some embodiments, once the pairing is established, the beacon may revert back to a static ID (e.g., the custom beacon ID may only be available during the connection process).

Similar to process 600, once connection has been established, in the example embodiment, no application layer data is transmitted directly from the personal device 260 into the target device 502 (e.g., over link flow 516). Additionally, and again similar to process 600, the target device 502 or the personal device 260 may perform monitoring activities or communications over the link flow 516 while the pairing connection remains established. When the pairing is terminated (e.g., based on loss of signal, loss of power, loss of connection, or by user or device request), the target device 502 may transmit a disconnection message to the casino management system server 114, causing the pairing record to be updated as disconnected or deleted from the database.

In some embodiments, the target device 502 may not establish pairing with the personal device 260. For example, process 700 may omit operations 762, 770, and 772, and may allow the connected actions 680 once the casino management system server 114 has verified that the personal device 260 has properly identified the custom ID broadcast by the target device 502. In such embodiments, the mobile device 260 may perform tethering with the target device 502. For example, the mobile device 260 may periodically detect whether the beacon ID of the target device 502 is still visible, within a predetermined range, or whether the beacon of the target device 502 is at a minimum signal strength. When the mobile device 260 detects conditions outside of this configuration, the mobile device 260 may transmit a connection termination message to the casino management system server 114, which in turn may update the database with the disconnection and prompt the target device 502 to cease transmitting the custom ID.

FIG. 8 is a swim lane diagram illustrating a cardless connection process 800 between the personal device 260 of the player 302, the casino management system server 114, and components of the smart table 300. The process 800 allows the player 302 (e.g., the personal device 260 of the player 302) to connect with the smart table 300 through use of their mobile device 604 (e.g., to facilitate various functionality associated with the player app 410). In the example embodiment, the smart table 300 includes an individual wireless beacon ("position beacon") 252 (e.g., a Bluetooth beacon) at each player position of the smart table 300. The position beacons 252 detect the presence of the nearby mobile device 260 within a device area (e.g., when the player 302 places the device 260 onto or within a pre-configured radius of the device area). In the example embodiment, the position beacon 252 is embedded within (e.g., underneath the table surface of) the table 300 near the arm rest rail 306 of each player position, and may be outlined on the table surface 308 to visually indicate where the player 302 should place their device 604 for proper connectivity. In some embodiments, each wireless beacon 252 includes a unique device ID that may be used to uniquely identify that beacon 252 and an association between that beacon 252 and the particular smart table 300 and player position at that smart table 300 (e.g., via smart table ID, position ID).

At operation 810, the position beacon 252 is configured to broadcast a generic ID (e.g., a default broadcast ID) while the beacon 252 is unpaired. At operation 820, the player 302 places their device 260 in the device area and initiates pairing via the player app at operation 822. Upon detecting the pairing request from the device 260, the smart table 300 requests a new custom ID from the casino management system server 114 at operation 830. The new custom ID request includes the unique device identifier for the beacon 252 ("beacon device ID") that is associated with the particular table 300 and position at that table 300, thereby allowing the casino management system server 114 to uniquely identify which table 300 and position the request is associated (e.g., via association between unique device ID, smart table ID, and position ID at that smart table). The new custom ID request may also include a unique device ID for the personal device 260 ("player device ID"). The beacon 252 is configured to allow a dynamic reconfiguration of the beacon ID, allowing the beacon 252 to change IDs during operation (e.g., to facilitate secure connections). At operation 832, the casino management system server 114 generates a new custom ID (e.g., based on an output of the RNG 212), stores an association of that new custom ID with the beacon device ID, table, position, and optionally the player device ID, and transmits that new custom ID to the smart table 300. In some embodiments, the new custom ID is generated to be unique amongst a pool of wireless beacon devices (e.g., multiple beacons 252) managed by the casino management system server 114. At operation 840, the smart table 300 reconfigures the beacon 252 with the custom ID and broadcasts that new custom ID back to the mobile device 260 of the player 302. In some embodiments, the smart table 300 may generate the new custom ID. In such embodiments, the smart table 300 may also transmit the custom ID to the casino management system server 114 for later confirmation during subsequent steps in the pairing process described herein.

At operation 850, the mobile device 260 receives the new custom ID from the beacon 252 and transmits a pairing request to the casino management system server 114. The pairing request identifies the identity of the player 302 (e.g., via loyalty ID, personal device ID, app ID, or such) as well as the new custom ID received from the beacon 252. At operation 860, the casino management system server 114 determines with which table and position the pairing request is associated (e.g., based on the received new custom ID) and may authenticate the identity of the personal device 260 (e.g., based on comparing the device ID of the request with the stored personal device ID associated with the new custom ID). In some embodiments, the casino management system server 114 may determine an identity of the player 302 (e.g., based on a player account name, a loyalty account ID, a mobile device ID of the personal device 260), and may provide player identification and other profile information on the player 302 to the smart table 300. If the request at operation 850 is authenticated, the casino management system server 114 assigns the player 302 to the particular smart table 300 and position (at operation 860 and transmits a pairing authorization message to the table 300 authorizing pairing with the personal device 260 at operation 870. The authorization message may also provide the identity of the player 302 (e.g., loyalty ID, app ID, or such) and other player information of the player 302 to the table 300. At operation 880, the table 300 establishes pairing with the personal device 260.

In some embodiments ("dealer-initiated pairing"), the dealer 304 may prompt the cardless connection process 800. For example, when the player 302 first occupies a particular position, the dealer 304 may initiate the pairing process for that particular position (e.g., via the table management device 320). Upon the dealer 304 initiating the pairing process, the table 300 may identify which beacon 252 is associated with the chosen position and may then initiate a request for a new custom ID, continuing the process 800 at operation 830. In some embodiments, the player 302 may be prompted (e.g., via the player app, after operation 840), whether they want to pair with the table 300, and may choose to accept or decline the pairing.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A system comprising:
   a server;
   a beacon configured to wirelessly broadcast to personal devices of players, wherein the beacon, when in a standby mode, is further configured to advertise a static beacon identifier; and
   an electronic casino device comprising at least one processor executing instructions which cause the at least one processor to:
   transmit a request for a unique beacon identifier to the server;

receive the unique beacon identifier from the server in response to the request; and configure the beacon with the unique beacon identifier, wherein the beacon is configured to broadcast the unique beacon identifier to a personal device associated with a player account;

wherein the server is further configured to:

receive a pairing request including a transmitted beacon identifier from the personal device, wherein the pairing request is generated in response to the broadcast of the unique beacon identifier to the personal device;

validate that the transmitted beacon identifier matches the unique beacon identifier;

store a valid association between the personal device and the electronic casino device; and authorize one or more connected actions to be performed by the personal device based on the valid association.

2. The system of claim 1, wherein the beacon is in the standby mode when the beacon is not transmitting the unique beacon identifier.

3. The system of claim 1, wherein the electronic casino device comprises at least one of an electronic gaming machine (EGM), a smart table, a kiosk, a smart phone, a tablet, a laptop, or a game console.

4. The system of claim 1, wherein the beacon is configured to automatically detect the personal device proximate the electronic casino device, wherein the request is transmitted based on the automatic detection of the personal device by the beacon.

5. The system of claim 1, wherein the instructions further cause the at least one processor to receive a player input indicating a connection request to initiate connection between the electronic casino device and the personal device, wherein the request for the unique beacon identifier is transmitted based on the player input.

6. The system of claim 1, wherein the server is further configured to transmit a pairing authorization message to the electronic casino device based on the valid association, wherein the electronic casino device is further configured to pair with the personal device based on receipt of the pairing authorization message, and wherein the pairing establishes a wireless communication session between the personal device and the electronic casino device.

7. The system of claim 6, wherein the electronic casino device is further configured to prohibit receipt of application layer network packets of a wireless communications protocol by the electronic casino device from the personal device.

8. The system of claim 6, wherein the instructions further cause the at least one processor to:

detect a disconnection of the personal device and the electronic casino device; and transmit a disconnection message to the server, thereby causing the association between the personal device and the electronic casino device to be updated and stored as invalid.

9. The system of claim 1, wherein the beacon is further configured to allow only unidirectional transmission of data to the personal device, thereby preventing data from being received at the beacon from the personal device.

10. The system of claim 1, wherein the one or more connected actions include at least one of one or more digital wallet transactions with the electronic casino device, identifying a player associated with the player account as a loyalty member in a loyalty program, establishing a gaming session, pausing a gaming session, or reserving the electronic casino device.

11. At least one non-transitory computer-readable storage medium with instructions stored thereon that, in response to execution by at least one processor, cause the at least one processor to:

receive, from a player tracking device associated with a beacon, a first request for a custom beacon identifier;

generate the custom beacon identifier;

transmit the custom beacon identifier to the player tracking device for transmission from the beacon to a mobile device associated with a player account;

receive a second request including a transmitted beacon identifier from the mobile device, wherein the second request is generated based at least in part upon transmission of the custom beacon identifier from the beacon to the mobile device, and wherein the second request further includes authentication credentials associated with the player account and a device identifier of the mobile device;

authenticate the player account using the received authentication credentials;

determine that the transmitted beacon identifier matches the custom beacon identifier;

store a valid association between the mobile device and the player tracking device; and authorize one or more connected actions to be performed by the mobile device based on the valid association between the mobile device and the player tracking device.

12. The at least one non-transitory computer-readable storage medium of claim 11, wherein the instructions further cause the at least one processor to transmit a pairing authorization message to the player tracking device based on the valid association, thereby causing the player tracking device to wirelessly connect with the mobile device based on receipt of the pairing authorization message.

13. The at least one non-transitory computer-readable storage medium of claim 11, wherein the at least one processor receives data regarding the one or more connected actions from the mobile device, and wherein the mobile device is in unidirectional communication with the beacon, thereby only receiving data from the beacon and not transmitting data to the beacon.

14. The at least one non-transitory computer-readable storage medium of claim 11, wherein the one or more connected actions include at least one of one or more digital wallet transactions, identifying a player associated with the player account as a loyalty member in a loyalty program, establishing a gaming session, pausing a gaming session, or reserving the player tracking device.

15. A computer-implemented method for wirelessly communicating between a casino device and a computer device associated with a player account, the method comprising:

determining a location of the computer device based upon signals from a player tracking device associated with the casino device;

based upon determining the location of the computer device, transmitting a request for a beacon identifier to a casino server;

receiving the beacon identifier from the casino server based upon the request;

configuring the player tracking device with the beacon identifier, wherein the player tracking device is configured to broadcast the beacon identifier to the computer device based upon receipt of the beacon identifier; and authorizing one or more connected actions to be performed by the computer device based upon receiving a message from the casino server indicating a valid association between the computer device and the player tracking device.

16. The computer-implemented method of claim 15, wherein the message indicates authentication of the player account by the casino server based upon authentication of authentication credentials associated with the player account.

17. The computer-implemented method of claim 15, wherein the signals from the player tracking device indicate the location of the computer device is proximate the casino device.

18. The computer-implemented method of claim 17, further comprising verifying continued presence of the computer device at the casino device.

19. The computer-implemented method of claim 18, further comprising maintaining a gaming session at the casino device based upon the verified continued presence of the computer device at the casino device.

20. The computer-implemented method of claim 15, further comprising establishing the location of the computer device based upon the signals from the player tracking device indicating the computer device is positioned within a predefined area associated with the player tracking device.

* * * * *